US012784680B2

(12) United States Patent
Ock et al.

(10) Patent No.: US 12,784,680 B2
(45) Date of Patent: Nov. 3, 2026

(54) DISPLAY DEVICE HAVING A PLURALITY OF DISPLAY MODES AND ELECTRONIC DEVICE INCLUDING THE SAME

(71) Applicant: Samsung Display Co., Ltd., Yongin-si (KR)

(72) Inventors: Soojo Ock, Yongin-si (KR); Chaehan Hyun, Yongin-si (KR); Hyungjin Song, Yongin-si (KR); Kwangsae Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/084,539

(22) Filed: Mar. 19, 2025

(65) Prior Publication Data

US 2025/0363947 A1 Nov. 27, 2025

(30) Foreign Application Priority Data

May 21, 2024 (KR) ........................ 10-2024-0065552

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2330/021* (2013.01)

(58) Field of Classification Search
CPC .................................................... G09G 3/3233
USPC ............................................................ 345/55
See application file for complete search history.

(56) References Cited

U.S. PATENT DOCUMENTS

| | | | | |
|---|---|---|---|---|
| 11,783,776 | B2 | 10/2023 | Matsueda | |
| 2022/0020313 | A1 | 1/2022 | Yeh et al. | |
| 2022/0301478 | A1 * | 9/2022 | Jeong | G09G 3/2003 |
| 2023/0068337 | A1 | 3/2023 | An et al. | |
| 2023/0133405 | A1 * | 5/2023 | Kato | G09G 3/20 345/63 |
| 2023/0147614 | A1 | 5/2023 | Bae et al. | |
| 2023/0230521 | A1 * | 7/2023 | Wu | G09G 3/2096 345/428 |
| 2024/0087504 | A1 * | 3/2024 | Gu | H10K 59/131 |

FOREIGN PATENT DOCUMENTS

| | | | |
|---|---|---|---|
| CN | 113948025 | A | 1/2022 |
| KR | 10-2023-0068496 | A | 5/2023 |
| KR | 10-2023-0104506 | A | 7/2023 |

* cited by examiner

*Primary Examiner* — Long D Pham
(74) *Attorney, Agent, or Firm* — Womble Bond Dickinson (US) LLP

(57) ABSTRACT

Disclosed is a display device including a first data line, a second data line, a (1-1)th pixel circuit connected to the first data line, a (2-1)th pixel circuit connected to the second data line, a (1-1)th light-emitting element connected to the (1-1) th pixel circuit, having a first state in a first mode, and having a second state in a second mode, a (1-2)th light-emitting element connected to the (2-1)th pixel circuit, and having the first state in the first mode and in the second mode, and a first bridge line crossing the first data line, and connecting the (2-1)th pixel circuit and the (1-2)th light-emitting element.

19 Claims, 19 Drawing Sheets

ED1-1, PXC1-1 } WPX1-1
ED1-3, PXC1-2 } WPX1-2
ED1-2, PXC2-1 } NPX1-1
ED1-4, PXC2-2 } NPX1-2
ED2-1, PXC3-1 } WPX2
ED3-1, PXC3-2 } WPX3
ED2-2, PXC4-2 } NPX2
ED3-2, PXC4-1 } NPX3

DISPLAY DEVICE HAVING A PLURALITY OF DISPLAY MODES AND ELECTRONIC DEVICE INCLUDING THE SAME

CROSS-REFERENCE TO RELATED APPLICATION

The present application claims priority to, and the benefit of, Korean Patent Application No. 10-2024-0065552, filed on May 21, 2024, in the Korean Intellectual Property Office, the entire disclosure of which is incorporated herein by reference.

BACKGROUND

Embodiments of the present disclosure described herein relate to a display device having a reduced power consumption, and an electronic device including the same.

Generally, electronic devices, such as smartphones, digital cameras, laptop computers, navigation systems, and smart televisions that provide images to a user, include display devices for displaying the images. The display device generates the image, and provides the generated image to the user through a display screen.

The display device includes a plurality of pixels for generating the image, and a driving unit for driving the pixels. Each of the pixels includes a light-emitting element, and a pixel circuit connected to the light-emitting element. The pixel circuit may be driven by the driving unit to cause the light-emitting element to emit a light.

A layout design of the pixel circuit and the light-emitting element is being developed to improve or maximize luminous efficiency while increasing a resolution in a limited space.

SUMMARY

Embodiments of the present disclosure provide a display device having a structure in which a viewing angle may be controlled, and having a reduced power consumption, and an electronic device including the same.

According to one or more embodiments, a display device includes a first data line, a second data line, a (1-1)$^{th}$ pixel circuit connected to the first data line, a (2-1)$^{th}$ pixel circuit connected to the second data line, a (1-1)$^{th}$ light-emitting element connected to the (1-1)$^{th}$ pixel circuit, having a first state in a first mode, and having a second state in a second mode, a (1-2)$^{th}$ light-emitting element connected to the (2-1)$^{th}$ pixel circuit, and having the first state in the first mode and in the second mode, and a first bridge line crossing the first data line, and connecting the (2-1)$^{th}$ pixel circuit and the (1-2)$^{th}$ light-emitting element.

The first data line may be configured to receive a first valid data signal in the first mode, and to receive an invalid data signal in the second mode, wherein the second data line is configured to receive a second valid data signal in the first mode and in the second mode.

The invalid data signal may have a voltage level corresponding to a black grayscale.

The first state may be a state in which the (1-1)$^{th}$ light-emitting element and the (1-2)$^{th}$ light-emitting element are turned on, wherein the second state is a state in which the (1-1)$^{th}$ light-emitting element is turned off.

The first data line and the second data line may extend in a first direction, wherein the (1-1)$^{th}$ light-emitting element and the (1-2)$^{th}$ light-emitting element are adjacent to each other in the first direction.

The first data line and the second data line may extend in a first direction, wherein "i" (1-1)$^{th}$ light-emitting elements and "j" (1-2)$^{th}$ light-emitting elements are alternately and repeatedly arranged in the first direction, "i" and "j" being a respective integer of 2 or more.

The display device may further include a (1-2)$^{th}$ pixel circuit connected to the first data line, a (2-2)$^{th}$ pixel circuit connected to the second data line, a (1-3)$^{th}$ light-emitting element connected to the (1-2)$^{th}$ pixel circuit, having the first state in the first mode, and having the second state in the second mode, a (1-4)$^{th}$ light-emitting element connected to the (2-2)$^{th}$ pixel circuit, and having the first state in the first mode and in the second mode, and a second bridge line crossing the first data line, and connecting the (1-2)$^{th}$ pixel circuit and the (1-3)$^{th}$ light-emitting element.

The first data line and the second data line may extend in a first direction, wherein the (1-1)$^{th}$ light-emitting element and the (1-2)$^{th}$ light-emitting element are adjacent to each other in the first direction, wherein the (1-3)$^{th}$ light-emitting element and the (1-4)$^{th}$ light-emitting element are adjacent to each other in the first direction, wherein the (1-1)$^{th}$ light-emitting element and the (1-3)$^{th}$ light-emitting element are adjacent to each other in a second direction crossing the first direction, and wherein the (1-2)$^{th}$ light-emitting element and the (1-4)$^{th}$ light-emitting element are adjacent to each other in the second direction.

The display device may further include a third data line, a fourth data line, a (3-1)$^{th}$ pixel circuit and a (3-2)$^{th}$ pixel circuit connected to the third data line, a (4-1)$^{th}$ pixel circuit and a (4-2)$^{th}$ pixel circuit connected to the fourth data line, a (2-1)$^{th}$ light-emitting element having the first state in the first mode, and having the second state in the second mode, a (2-2)$^{th}$ light-emitting element having the first state in the first mode and in the second mode, a (3-1)$^{th}$ light-emitting element having the first state in the first mode, and having the second state in the second mode, and a (3-2)$^{th}$ light-emitting element having the first state in the first mode and in the second mode.

The (2-1)$^{th}$ light-emitting element may be connected to the (3-1)$^{th}$ pixel circuit, wherein the (2-2)$^{th}$ light-emitting element is connected to the (4-2)$^{th}$ pixel circuit, wherein the (3-1)$^{th}$ light-emitting element is connected to the (3-2)$^{th}$ pixel circuit, and wherein the (3-2)$^{th}$ light-emitting element is connected to the (4-1)$^{th}$ pixel circuit.

The (2-1)$^{th}$ light-emitting element may be connected to the (3-1)$^{th}$ pixel circuit, wherein the (2-2)$^{th}$ light-emitting element is connected to the (3-2)$^{th}$ pixel circuit, wherein the (3-1)$^{th}$ light-emitting element is connected to the (4-2)$^{th}$ pixel circuit, and wherein the (3-2)$^{th}$ light-emitting element is connected to the (4-1)$^{th}$ pixel circuit.

The display device may further include a third bridge line crossing the first data line, and connecting the (3-2)$^{th}$ pixel circuit and the (2-2)$^{th}$ light-emitting element, and a fourth bridge line crossing the first data line, and connecting the (4-2)$^{th}$ pixel circuit and the (3-1)$^{th}$ light-emitting element.

The third data line may be configured to receive a third valid data signal in the first mode, and is configured to receive an invalid data signal in the second mode, wherein the fourth data line is configured to receive a fourth valid data signal in the first mode and in the second mode.

The third data line and the fourth data line may extend in a first direction, wherein the (2-1)$^{th}$ light-emitting element and the (3-1)$^{th}$ light-emitting element are adjacent to each other in the first direction, wherein the (2-2)$^{th}$ light-emitting element and the (3-2)$^{th}$ light-emitting element are adjacent to each other in the first direction, wherein the (2-1)$^{th}$ light-emitting element and the (3-2)$^{th}$ light-emitting element are adjacent to each other in a second direction crossing the first direction, and wherein the $(3\text{-}1)^{th}$ light-emitting element and the $(2\text{-}2)^{th}$ light-emitting element are adjacent to each other in the second direction.

The third data line and the fourth data line may extend in a first direction, wherein the $(2\text{-}1)^{th}$ light-emitting element and the $(3\text{-}1)^{th}$ light-emitting element are adjacent to each other in the first direction, wherein "k" of the $(2\text{-}1)^{th}$ light-emitting elements and "l" of the $(3\text{-}2)^{th}$ light-emitting elements are alternately and repeatedly arranged in a second direction crossing the first direction, "k" and "l" being a respective integer of 2 or more, and wherein "k" of the $(3\text{-}1)^{th}$ light-emitting elements and "l" of the $(2\text{-}2)^{th}$ light-emitting elements are alternately and repeatedly arranged in the second direction.

The display device may further include a light-shielding pattern above the $(1\text{-}1)^{th}$ light-emitting element and the $(1\text{-}2)^{th}$ light-emitting element, and defining a first opening corresponding to the $(1\text{-}1)^{th}$ light-emitting element, and a second opening having a size that is smaller than a size of the first opening, and corresponding to the $(1\text{-}2)^{th}$ light-emitting element.

According to one or more embodiments, a display device includes a first data line, a second data line, a plurality of wide pixels, and a plurality of narrow pixels, wherein a first group and a second group includes a first wide pixel, a second wide pixel, a first narrow pixel, and a second narrow pixel, wherein the first wide pixel and the second wide pixel of the first group are connected to the first data line, wherein the first narrow pixel and the second narrow pixel of the first group are connected to the second data line, wherein the first wide pixel and the first narrow pixel of the second group are connected to a first one of the first data line and the second data line, and wherein the second wide pixel and the second narrow pixel of the second group are connected to a second one of the first data line and the second data line.

The first data line and the second data line may extend in a first direction, wherein the first group and the second group are alternately arranged in the first direction.

The first wide pixel of the first group and the first wide pixel of the second group may include a $(1\text{-}1)^{th}$ pixel circuit connected to the first data line, and a $(1\text{-}1)^{th}$ light-emitting element connected to the $(1\text{-}1)^{th}$ pixel circuit, wherein the second narrow pixel of the first group and the second narrow pixel of the second group includes a $(2\text{-}2)^{th}$ pixel circuit connected to the second data line, and a $(1\text{-}4)^{th}$ light-emitting element connected to the $(2\text{-}2)^{th}$ pixel circuit.

According to one or more embodiments, an electronic device includes a display device for provide an image, and including a first data line, a second data line, a $(1\text{-}1)^{th}$ pixel circuit connected to the first data line, a $(2\text{-}1)^{th}$ pixel circuit connected to the second data line, a $(1\text{-}1)^{th}$ light-emitting element connected to the $(1\text{-}1)^{th}$ pixel circuit, having a first state in a first mode, and having a second state in a second mode, a $(1\text{-}2)^{th}$ light-emitting element connected to the $(2\text{-}1)^{th}$ pixel circuit, and having the first state in the first mode and in the second mode, and a first bridge line crossing the first data line, and connecting the $(2\text{-}1)^{th}$ pixel circuit and the $(1\text{-}2)^{th}$ light-emitting element.

BRIEF DESCRIPTION OF THE DRAWINGS

The above and other aspects of the present disclosure will become apparent by describing in detail embodiments thereof with reference to the accompanying drawings.

DETAILED DESCRIPTION

Figure 1:
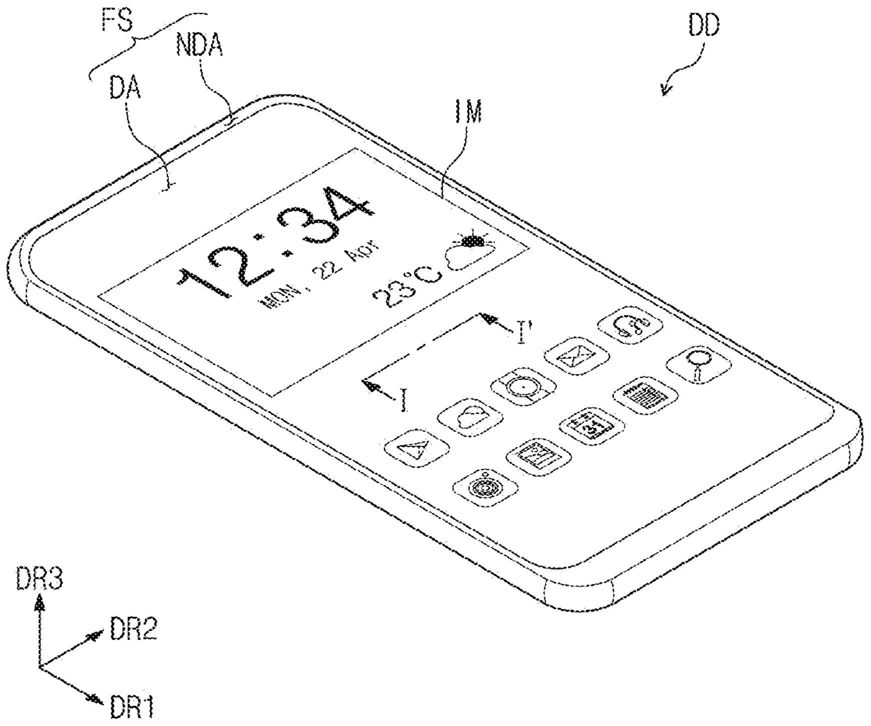
FIG. 1 is a perspective view of a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same". In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device according to one or more embodiments of the present disclosure.

Referring to FIG. 1, a display device DD may have a shape having long sides in a first direction DR1, and short sides in a second direction DR2 crossing the first direction DR1. However, the shape of the display device DD is not limited thereto, and the display device DD may be provided in various shapes.

As illustrated in FIG. 1, the display device DD may display an image IM on a display surface FS, which is parallel to the first direction DR1 and the second direction DR2, in a third direction DR3 that crosses the first direction DR1 and the second direction DR2. The display surface FS on which the image IM is displayed may correspond to a front surface of the display device DD.

A display area DA may be an area in which the image IM is displayed, and a user may visually recognize the image IM through the display area DA. A shape of the display area DA may be substantially defined by a non-display area NDA. However, this is illustratively illustrated, and the non-display area NDA may be located adjacent to only one side of the display area DA or may be omitted. The display device DD according to one or more embodiments of the present disclosure may include various embodiments and is not limited to one or more embodiments.

The non-display area NDA, which is an area adjacent to the display area DA, may be an area in which the image IM is not displayed. A bezel area of the display device DD may be defined by the non-display area NDA. The non-display area NDA may surround the display area DA (e.g., in plan view). However, this is illustratively illustrated, and the non-display area NDA may be adjacent to only a portion of an edge of the display area DA, and the present disclosure is not limited to one or more embodiments.

The display device DD according to one or more embodiments is a device for displaying a video or still image, and may be used as a display screen for various products, such as television, laptops, monitors, billboards, Internet of Things (IoTs), as well as portable electronic devices, such as mobile phone, smart phone, smart pad, tablet personal computer (PC), mobile communication terminal, electronic notebook, electronic book, portable multimedia player PMP, personal digital assistant PDA, MP3 player, navigation system, and ultra mobile PC UMPC. In addition, the display device DD according to one or more embodiments may be used in wearable devices, such as smart watches, watch phones, glasses-type displays, head-mounted displays HMDs, virtual reality (VR) devices, or augmented reality (AR) devices. In addition, the display device DD according to one or more embodiments may be used as a dashboard of a vehicle, a center information display (CID) disposed in a center fascia or a dashboard of the vehicle, a room mirror display replacing a side mirror of the vehicle, an entertainment element for a rear seat of the vehicle, and a display disposed on a rear surface of the front seat.

Figure 2A:
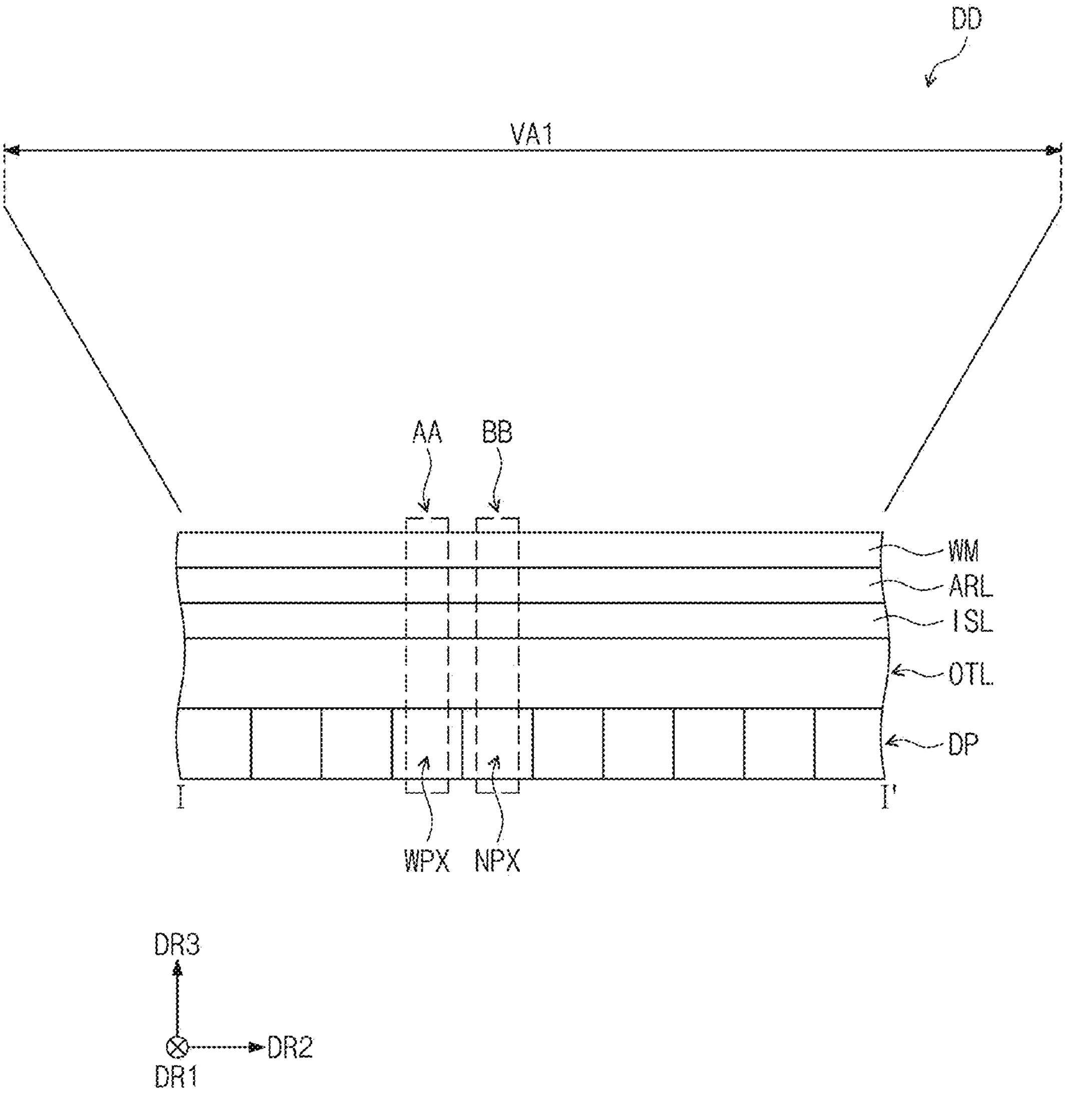
FIGS. 2A and 2B are cross-sectional views of the display device along the line I-I' of FIG. 1.
Figure 2B:
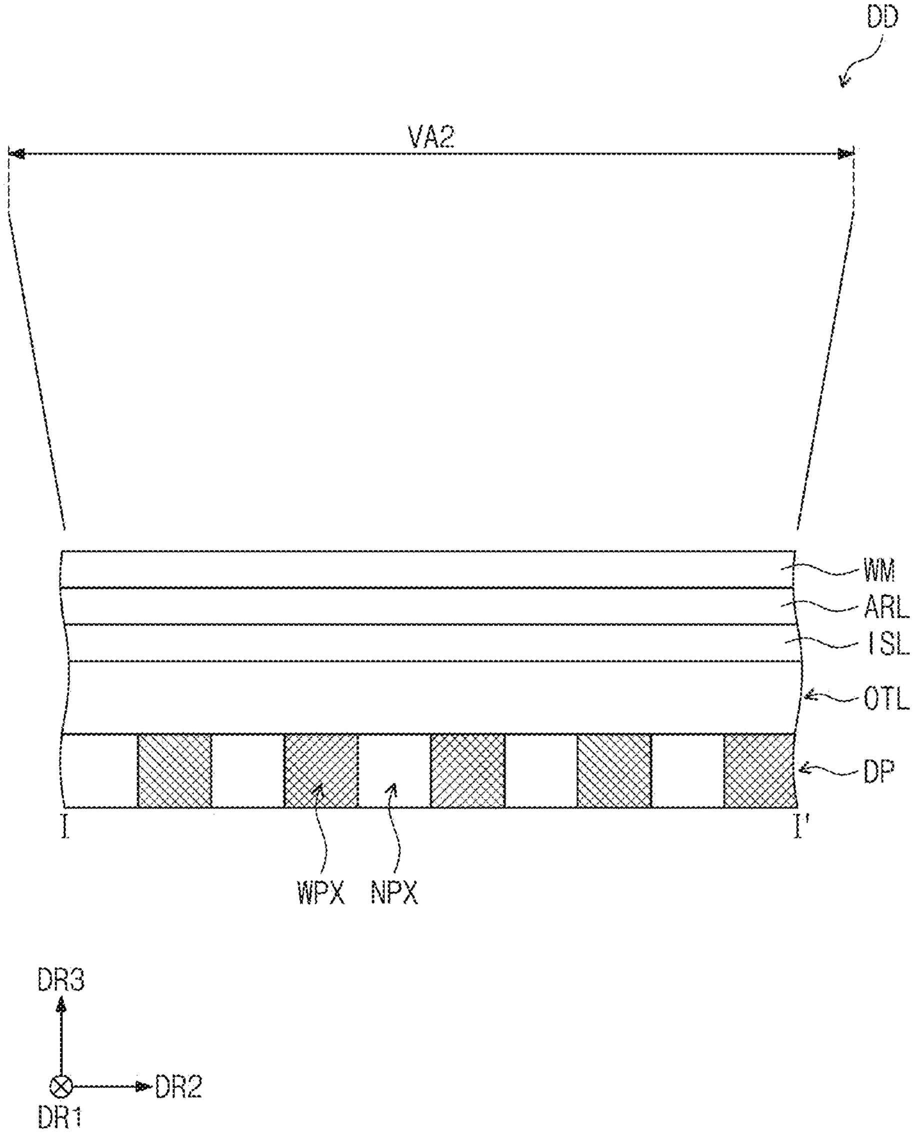

FIGS. 2A and 2B are cross-sectional views of the display device along the line I-I' of FIG. 1.

Referring to FIGS. 2A and 2B, the display device DD may include a display panel DP, an optical layer OTL, an input-sensing layer ISL, a reflection-preventing layer (e.g., reflection-reducing layer) ARL, and a window WM. FIG. 2A is a cross-sectional view of the display device DD that operates in a first mode, and FIG. 2B is a cross-sectional view of the display device DD that operates in a second mode. The first mode may be referred to as a wide viewing mode or a normal mode in which an image is displayed at a relatively wide viewing angle. The second mode may be referred to as a narrow viewing mode or private mode in which an image is displayed at a relatively narrow viewing angle. In the second mode, a viewing angle is narrowed so that the image may be viewed only from a front surface, and the image may be invisible or distorted from angles other than the front surface. The user may adjust the viewing angle of the display device DD by selecting the first mode or the second mode depending on a situation.

The display panel DP according to one or more embodiments of the present disclosure may be a light-emitting display panel, but the present disclosure is not particularly limited thereto. For example, the display panel DP may be an organic light-emitting display panel, an inorganic light-emitting display panel, or a quantum dot light-emitting display panel. A light-emitting layer of the organic light-emitting display panel may include an organic light-emitting material, and a light-emitting layer of the inorganic light-emitting display panel may include an inorganic light-emitting material. A light-emitting layer of the quantum dot light-emitting display panel may include a quantum dot, a quantum rod, or the like. Hereinafter, the display panel DP will be described as the organic light-emitting display panel.

The display panel DP may include wide pixels (or normal pixels) WPX and narrow pixels NPX. The wide pixels WPX and the narrow pixels NPX may be arranged alternately in the first and second directions DR1 and DR2. Each of the wide pixels WPX and the narrow pixels NPX may include a light-emitting element and a pixel circuit.

The wide pixels WPX may be turned on in the first mode and turned off in the second mode. As illustrated in FIG. 2A, when the display device DD is driven in the first mode, the wide pixels WPX and the narrow pixels NPX may be turned on, and the image may be output to a first viewing area VA1 through the wide pixels WPX and the narrow pixels NPX. As illustrated in FIG. 2B, when the display device DD is driven in the second mode, the wide pixels WPX may be turned off, the narrow pixels NPX may be turned on, and thus the image may be output to a second viewing area VA2 only through the narrow pixels NPX. According to one or more embodiments of the present disclosure, the first viewing area VA1 is larger than the second viewing area VA2.

The optical layer OTL may be located on the display panel DP. The optical layer OTL may form an optical system that controls light output ranges of lights output from the wide pixels WPX and the narrow pixels NPX. According to one or more embodiments of the present disclosure, the optical layer OTL may be formed on the display panel DP through a continuous process. That is, when the optical layer OTL is directly located on the display panel DP, a separate adhesive film is not located between the optical layer OTL and the display panel DP.

The input-sensing layer ISL may sense an external input (e.g., a user's touch), and may convert the external input into an input signal (e.g., predetermined input signal). The input-sensing layer ISL may include a plurality of sensing electrodes for sensing the external input. The sensing electrodes may sense the external input in a capacitive manner. The display panel DP may generate an image corresponding to the input signal.

The reflection-preventing layer ARL decreases a reflectance of an external light input from an upper side of the window WM. As an example of the present disclosure, the reflection-preventing layer ARL may be located on the input-sensing layer ISL. However, the present disclosure is not limited thereto. Alternatively, the reflection-preventing layer ARL may be located between the display panel DP and the input-sensing layer ISL. The reflection-preventing layer ARL may include a plurality of color filters and a black matrix. The arrangement of the color filters may be determined in consideration of colors of lights generated by the plurality of pixels WPX and NPX included in the display panel DP. Alternatively, the reflection-preventing layer ARL may include a phase retarder and a polarizer. The retarder may be of a film type or a liquid-crystal-coating type, and may include a $\lambda/2$ phase retarder and/or a $\lambda/4$ phase retarder. The polarizer may also be of a film type or a liquid-crystal-coating type. The film type may include a stretchable synthetic resin film, and the liquid-crystal-coating type may include liquid crystals arranged in a corresponding form. The phase retarder and the polarizer may be implemented as one polarization film. The black matrix may be referred to as a light-shielding pattern.

A front surface of the window WM defines the display surface FS of the display device DD. The window WM may include an optically transparent insulating material. For example, the window WM may include a glass or plastic. The window WM may have a multi-layer structure or a single-layer structure. For example, the window WM may include a plurality of plastic films coupled through an adhesive or include a glass substrate and a plastic substrate coupled through an adhesive.

Figure 3A:
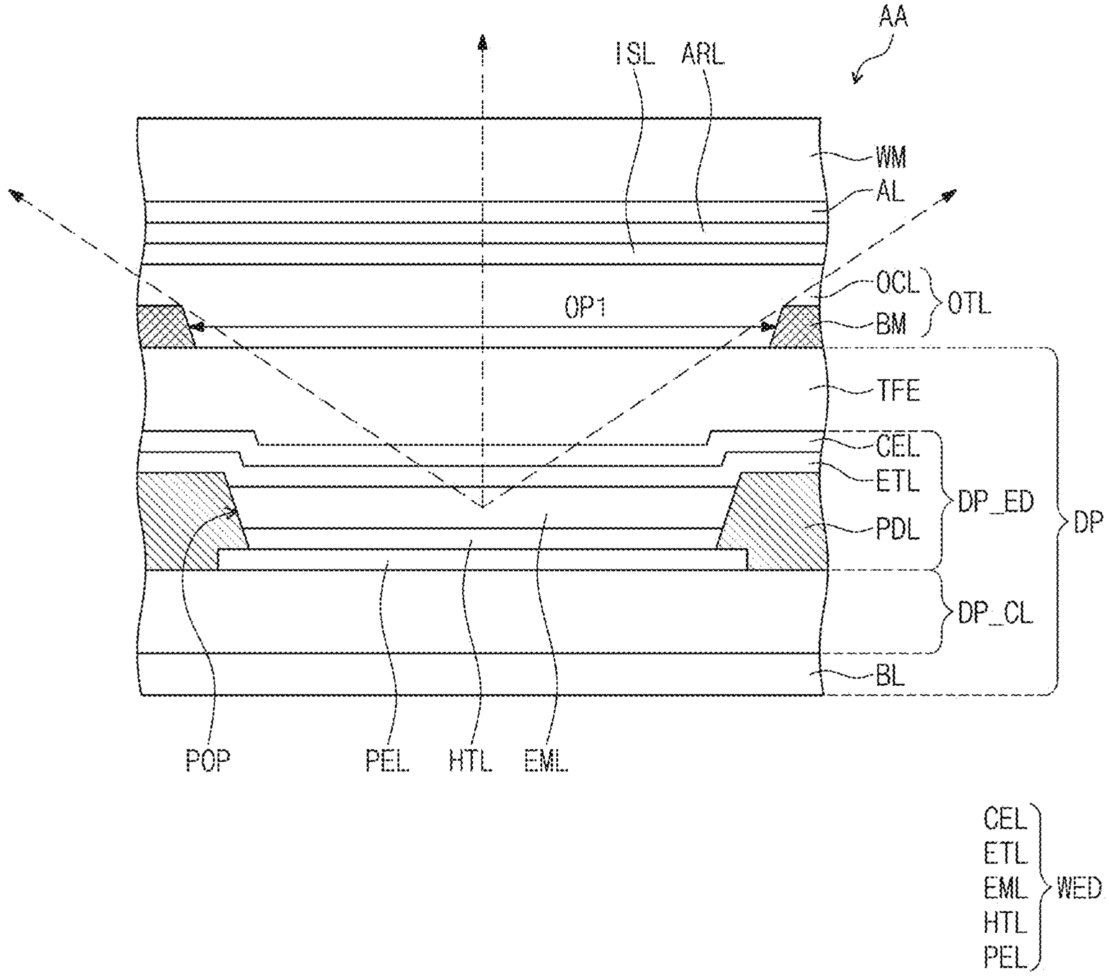
FIG. 3A is an enlarged cross-sectional view of area AA of FIG. 2A.
Figure 3B:
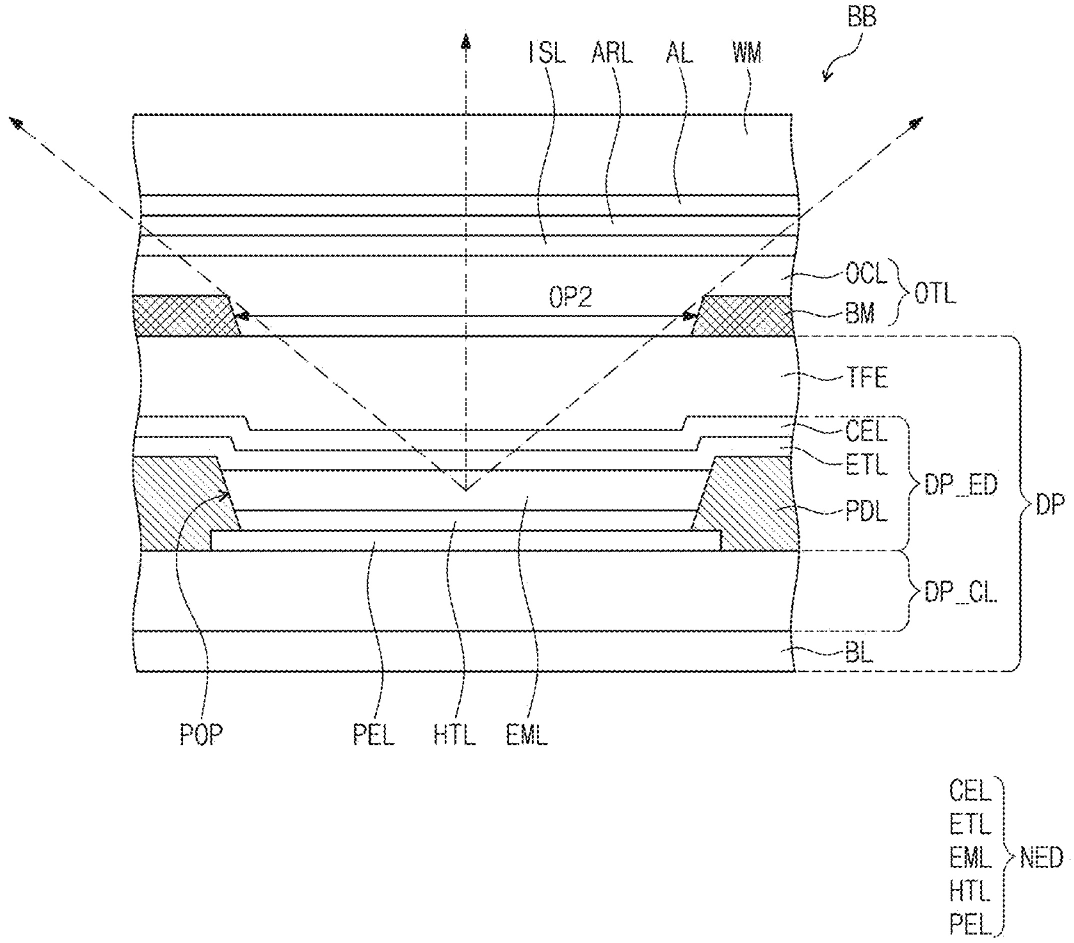
FIG. 3B is an enlarged cross-sectional view of area BB of FIG. 2A.

FIG. 3A is an enlarged cross-sectional view of area AA of FIG. 2A. FIG. 3B is an enlarged cross-sectional view of area BB of FIG. 2A.

Referring to FIGS. 3A and 3B, the display panel DP includes a base layer BL, a circuit layer DP_CL, an element layer DP_ED, and an encapsulation layer TFE. The display panel DP according to the present disclosure may be a flexible display panel. However, the present disclosure is not limited thereto. For example, the display panel DP may be a foldable display panel that is folded with respect to a folding axis or a rigid display panel.

The base layer BL may include a synthetic resin layer. The synthetic resin layer may be a polyimide-based resin layer, and a material thereof is not particularly limited thereto. In addition, the base layer BL may include a glass substrate, a metal substrate, an organic/inorganic composite material substrate, or the like.

The circuit layer DP_CL is located on the base layer BL. The circuit layer DP_CL is located between the base layer BL and the element layer DP_ED. The circuit layer DP_CL includes at least one insulating layer and a circuit element. Hereinafter, the insulating layer included in the circuit layer DP_CL is referred to as an intermediate insulating layer. The intermediate insulating layer includes at least one intermediate inorganic film and at least one intermediate organic film. The circuit element may include a pixel circuit included in each of the wide pixels WPX (see FIG. 2A) and the narrow pixels NPX (see FIG. 2A).

The element layer DP_ED may include a light-emitting element included in each of the wide pixels WPX (see FIG. 2A) and the narrow pixels NPX (see FIG. 2A). The light-emitting element included in each wide pixel WPX is referred to as a wide light-emitting element WED, and the light-emitting element included in each narrow pixel NPX is referred to as a narrow light-emitting element NED.

An anode electrode PEL is formed on the circuit layer DP_CL. A pixel-defining film PDL may be provided on the circuit layer DP_CL to partially cover the anode electrode PEL. A pixel opening POP for exposing a portion (e.g., predetermined portion) of the anode electrode PEL may be defined in the pixel-defining film PDL. Each of the wide light-emitting element WED and the narrow light-emitting element NED may have a shape corresponding to a shape of the pixel opening POP.

Each of the wide light-emitting element WED and the narrow light-emitting element NED may include the anode electrode PEL, a hole transport layer HTL, a light-emitting layer EML, an electron transport layer ETL, and a common cathode electrode CEL. The hole transport layer HTL is located on the anode electrode PEL exposed through the pixel opening POP, and the light-emitting layer EML is located on the hole transport layer HTL. Holes may move to the light-emitting layer EML through the hole transport layer HTL. The light-emitting layer EML may include an organic light-emitting material and/or an inorganic light-emitting material. The light-emitting layer EML of each of the wide light-emitting element WED and the narrow light-emitting element NED may generate a light having a color depending on the type of light-emitting material included in the light-emitting layer EML. In FIGS. 3A and 3B, the wide light-emitting element WED and the narrow light-emitting element NED may output a light having the same color.

The encapsulation layer TFE seals the element layer DP_ED. The encapsulation layer TFE may include at least one organic film and at least one inorganic film. The inorganic film may include an inorganic material, and may protect the element layer DP_ED from moisture/oxygen. The inorganic film may include a silicon nitride layer, a silicon oxy nitride layer, a silicon oxide layer, a titanium oxide layer, an aluminum oxide layer, or the like, but the present disclosure is not limited thereto. The organic film may include an organic material and protect the element layer DP_ED from foreign substances, such as dust particles.

The optical layer OTL may be provided on the encapsulation layer TFE. The optical layer OTL may include a black matrix BM and an overcoating layer OCL. The black matrix BM may absorb or shield the light output from the wide light-emitting element WED and the narrow light-emitting element NED. The black matrix BM may include an organic light-shielding material. For example, the organic light-shielding material may include one of carbon black and titan black, but the present disclosure is not limited thereto. The black matrix BM may be located to overlap the pixel-defining film PDL.

A plurality of openings may be provided in the optical layer OTL by the black matrix BM. FIG. 3A illustrates a first opening OP1 formed to correspond to the wide light-emitting element WED among the plurality of openings, and FIG. 3B illustrates a second opening OP2 formed to correspond to the narrow light-emitting element NED among the plurality of openings. A size of the first opening OP1 may be larger than a size of the second opening OP2.

When the second opening OP2 is smaller than the first opening OP1, a ratio of the light shielded by the black matrix BM to the light output from the narrow light-emitting element NED may be increased. For example, a light traveling in a direction inclined with respect to a normal line perpendicular to the display surface FS, rather than a light traveling in a direction parallel to the normal line, may be shielded by the black matrix BM. The first opening OP1 may output a light inclined at a first angle with respect to the normal line, but the second opening OP2 may output a light inclined at a second angle smaller than the first angle with respect to the normal line. Thus, the optical layer OTL may control viewing angles of the light output from the wide light-emitting element WED and the light output from the narrow light-emitting element NED. That is, due to the optical layer OTL, the viewing angle of the light output from the narrow light-emitting element NED may be narrower than the viewing angle of the light output from the wide light-emitting element WED. Thus, in the second mode, when the wide pixel WPX is turned off and only the narrow pixel NPX is turned on, the display device DD may output an image having a narrow viewing angle.

The overcoating layer OCL may be provided to cover the black matrix BM and the encapsulation layer TFE exposed through the plurality of openings. The overcoating layer OCL may include an organic insulating material. The overcoating layer OCL may be provided in a thickness sufficient to remove a step between the black matrix BM and the encapsulation layer TFE. The overcoating layer OCL may have a thickness (e.g., predetermined thickness), may include a material without particular limitation as long as the material may flatten an upper surface of the optical layer OTL, and may include, for example, an acrylate-based organic material.

The display device DD according to one or more embodiments of the present disclosure may further include an adhesive layer AL. The window WM may be attached to the reflection-preventing layer ARL by the adhesive layer AL. The adhesive layer AL may include an optical clear adhesive, an optically clear adhesive resin, or a pressure-sensitive adhesive (PSA).

Figure 4:
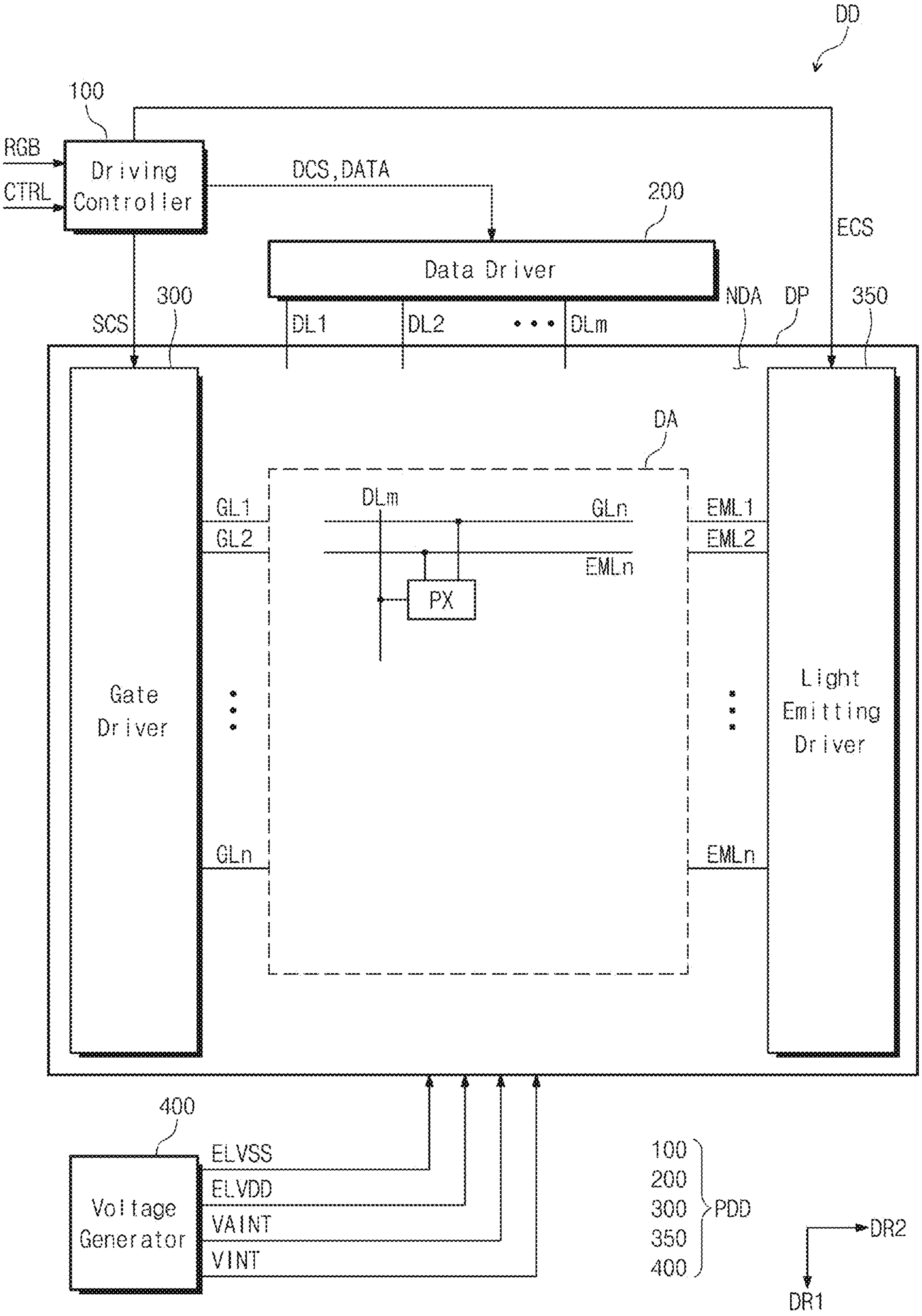
FIG. 4 is a block diagram of the display device according to one or more embodiments of the present disclosure.

FIG. 4 is a block diagram of the display device according to one or more embodiments of the present disclosure.

Referring to FIG. 4, the display device DD may include the display panel DP and a panel driver PDD. The panel driver PDD may include a driving controller 100, a data driver 200, a gate driver 300, a light-emitting driver 350, and a voltage generator 400.

The display panel DP may include the display area DA, and the non-display area NDA surrounding at least a portion of the display area DA. The display panel DP may include a pixel PX located in the display area DA. The display panel DP may include scan lines GL1 to GLn, light-emitting control lines EML1 to EMLn, and data lines DL1 to DLm.

The driving controller 100 receives an image signal RGB and a control signal CTRL. The driving controller 100 generates image data DATA obtained by converting a data format of the image signal RGB to meet an interface specification with the data driver 200. The driving controller 100 outputs a first driving control signal SCS, a second driving control signal DCS, and a third driving control signal ECS.

The data driver 200 receives the second driving control signal DCS and the image data DATA from the driving controller 100. The data driver 200 converts the image data DATA into data signals DS, and outputs the data signals DS to the data lines DL1 to DLm. The data signals DS are analog voltages corresponding to grayscale values of the image data DATA. Each of the data lines DL1 to DLm may extend in the first direction DR1, and the data lines DL1 to DLm may be arranged in the second direction DR2. Here, "m" may be an integer (or natural number) greater than or equal to 1.

The gate driver 300 receives the first driving control signal SCS from the driving controller 100. The gate driver 300 may be connected to the scan lines GL1 to GLn. The gate driver 300 may output scan signals to the scan lines GL1 to GLn, respectively, in response to the first driving control signal SCS.

The light-emitting driver 350 may be connected to the light-emitting control lines EML1 to EMLn. The light-emitting driver 350 may output light-emitting control signals to the light-emitting control lines EML1 to EMLn in response to the third driving control signal ECS from the driving controller 100.

The voltage generator 400 (or a power supplier) generates voltages required for operation of the display panel DP. In one or more embodiments of the present disclosure, the voltage generator 400 may generate a first driving voltage ELVDD, a second driving voltage ELVSS, a first initialization voltage VINT, and a second initialization voltage VAINT.

The plurality of pixels PX may be electrically connected to the scan lines GL1 to GLn, the light-emitting control lines EML1 to EMLn, and the data lines DL1 to DLm. For example, the pixels PX in an $n^{th}$ row may be connected to the $n^{th}$ scan line GLn and the $n^{th}$ light-emitting control line EMLn, and the pixels PX in an $m^{th}$ column may be connected to the $m^{th}$ data line DLm.

Figure 5:
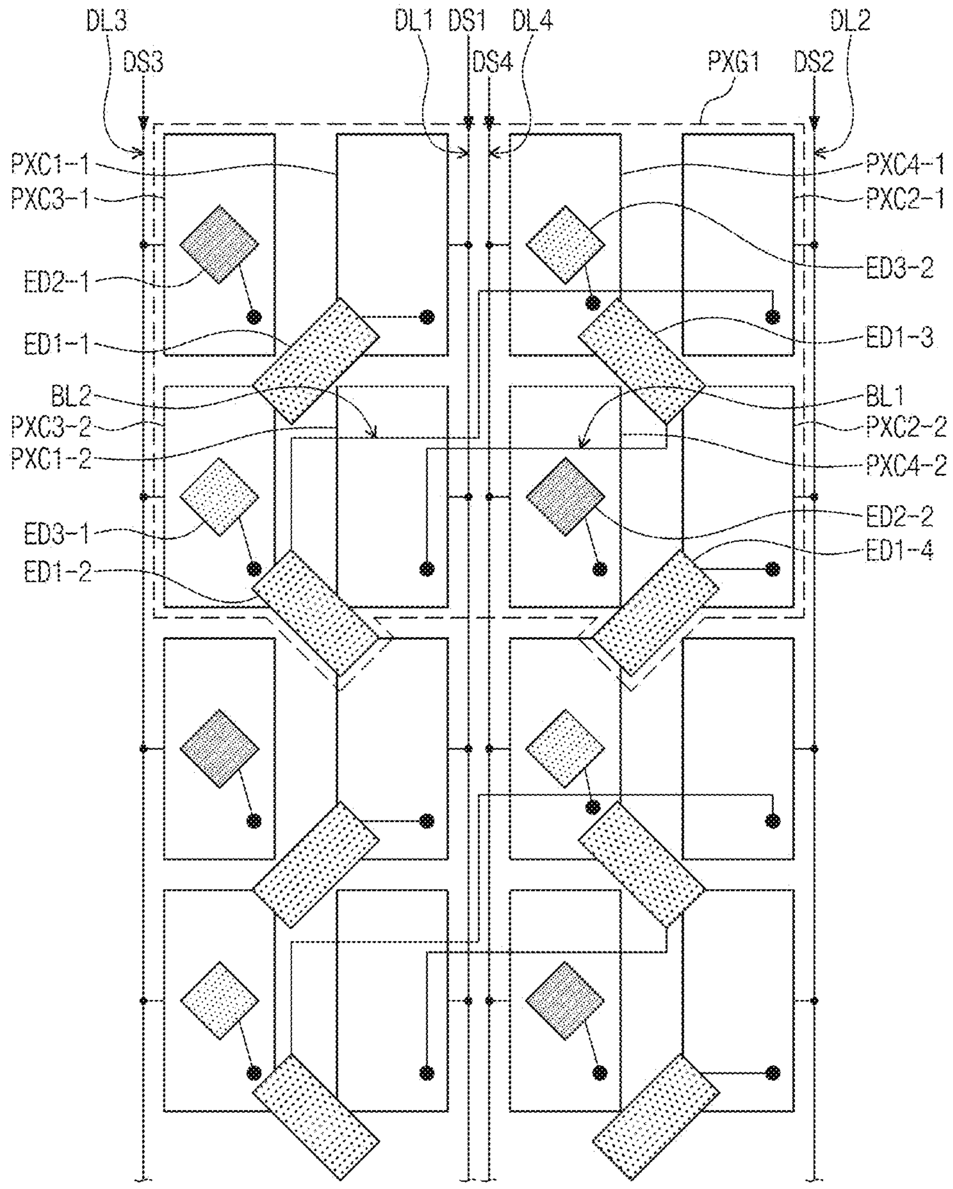
FIG. 5 is a block diagram of pixels according to one or more embodiments of the present disclosure.
Figure 5:
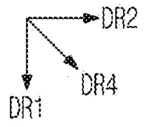

FIG. 5 is a block diagram of the pixels according to one or more embodiments of the present disclosure.

Referring to FIG. 5, the plurality of pixels may be arranged in the first and second directions DR1 and DR2 in units of first groups PXG1. The first group PXG1 may include four first pixels (e.g., green pixels), two second pixels (e.g., red pixels), and two third pixels (e.g., blue pixels). The four first pixels include two first wide pixels and two first narrow pixels. The two first wide pixels are referred to as a (1-1)$^{th}$ wide pixel WPX1-1 and a (1-2)$^{th}$ wide pixel WPX1-2, and the two first narrow pixels are referred to as a (1-1)$^{th}$ narrow pixel NPX1-1 and a (1-2)$^{th}$ narrow pixel NPX1-2. The two second pixels include one second wide pixel WPX2 and one second narrow pixel NPX2, and the two third pixels include one third wide pixel WPX3 and one third narrow pixel NPX3. Thus, the first group PXG1 may include the four wide pixels WPX1-1, WPX1-2, WPX2, and WPX3 and the four narrow pixels NPX1-1, NPX1-2, NPX2, and NPX3. The plurality of pixels included in the first group PXG1 may be arranged in a two-row/four-column structure. Here, columns may be in a direction parallel to the first direction DR1, and rows may be in a direction parallel in the second direction DR2.

Four data lines (hereinafter, referred to as first to fourth data lines) are connected to the first group PXG1. The first to fourth data lines DL1 to DL4 extend in the first direction DR1 and are arranged in the second direction DR2. The first to fourth data lines DL1 to DL4 are connected to only the wide pixels WPX1-1, WPX1-2, WPX2, and WPX3 or only the narrow pixels NPX1-1, NPX1-2, NPX2, and NPX3, respectively. The (1-1)$^{th}$ wide pixel WPX1-1 and the (1-2)$^{th}$ wide pixel WPX1-2 are connected to the first data line DL1, and the (1-1)$^{th}$ narrow pixel NPX1-1 and the (1-2)$^{th}$ narrow pixel NPX1-2 are connected to the second data line DL2. The second wide pixel WPX2 and the third wide pixel WPX3 are connected to the third data line DL3, and the second narrow pixel NPX2 and the third narrow pixel NPX3 are connected to the fourth data line DL4.

The wide pixel WPX1-1 includes a (1-1)$^{th}$ pixel circuit PXC1-1 connected to the first data line DL1, and a (1-1)$^{th}$ light-emitting element ED1-1 connected to the (1-1)$^{th}$ pixel circuit PXC1-1. The (1-1)$^{th}$ narrow pixel NPX1-1 includes a (2-1)$^{th}$ pixel circuit PXC2-1 connected to the second data line DL2, and a (1-2)$^{th}$ light-emitting element ED1-2 connected to the (2-1)$^{th}$ pixel circuit PXC2-1. The (1-2)$^{th}$ wide pixel WPX1-2 includes a (1-2)$^{th}$ pixel circuit PXC1-2 connected to the first data line DL1, and a (1-3)$^{th}$ light-emitting element ED1-3 connected to the (1-2)$^{th}$ pixel circuit PXC1-2. The (1-2)$^{th}$ narrow pixel NPX1-2 includes a (2-2)$^{th}$ pixel circuit PXC2-2 connected to the second data line DL2, and a (1-4)$^{th}$ light-emitting element ED1-4 connected to the (2-2)$^{th}$ pixel circuit PXC2-2.

The (1-1)$^{th}$ pixel circuit PXC1-1 and the (1-2)$^{th}$ pixel circuit PXC1-2 connected to the first data line DL1 are arranged adjacent to each other in the first direction DR1, and the (1-1)$^{th}$ light-emitting element ED1-1 and the (1-3)$^{th}$ light-emitting element ED1-3 are arranged adjacent to each other in the second direction DR2. The (1-1)$^{th}$ pixel circuit PXC1-1 and the (1-1)$^{th}$ light-emitting element ED1-1 may overlap each other on a plane, but the (1-2)$^{th}$ pixel circuit PXC1-2 and the (1-3)$^{th}$ light-emitting element ED1-3 may not overlap each other on a plane. As an example of the present disclosure, the (1-2)$^{th}$ pixel circuit PXC1-2 and the (1-3)$^{th}$ light-emitting element ED1-3 may be connected to each other through a first bridge line BL1. The first bridge line BL1 may cross the first data line DL1.

The (2-1)$^{th}$ pixel circuit PXC2-1 and the (2-2)$^{th}$ pixel circuit PXC2-2 connected to the second data line DL2 are arranged adjacent to each other in the first direction DR1, and the (1-2)$^{th}$ light-emitting element ED1-2 and the (1-4)$^{th}$ light-emitting element ED1-4 are arranged adjacent to each other in the second direction DR2. The (2-2)$^{th}$ pixel circuit PXC2-2 and the (1-4)$^{th}$ light-emitting element ED1-4 may overlap each other on a plane, but the (2-1)$^{th}$ pixel circuit PXC2-1 and the (1-2)$^{th}$ light-emitting element ED1-2 may not overlap each other on a plane. As an example of the present disclosure, the (2-1)$^{th}$ pixel circuit PXC2-1 and the (1-2)$^{th}$ light-emitting element ED1-2 may be connected to each other through a second bridge line BL2. The second bridge line BL2 may cross the first data line DL1.

The fourth data line DL4 may be located between the first data line DL1 and the second data line DL2, and in this case, the first and second bridge lines BL1 and BL2 may further cross the fourth data line DL4.

The second wide pixel WPX2 includes a (3-1)$^{th}$ pixel circuit PXC3-1 connected to the third data line DL3 and a (2-1)$^{th}$ light-emitting element ED2-1 connected to the (3-1)$^{th}$ pixel circuit PXC3-1. The third wide pixel WPX3 includes a (3-2)$^{th}$ pixel circuit PXC3-2 connected to the third data line DL3 and a (3-1)$^{th}$ light-emitting element ED3-1 connected to the (3-2)$^{th}$ pixel circuit PXC3-2. The second narrow pixel NPX2 includes a (4-2)$^{th}$ pixel circuit PXC4-2 connected to the fourth data line DL4 and a (2-2)$^{th}$ light-emitting element ED2-2 connected to the (4-2)$^{th}$ pixel circuit PXC4-2. The third narrow pixel NPX3 includes a (4-1)$^{th}$ pixel circuit PXC4-1 connected to the fourth data line DL4 and a (3-2)$^{th}$ light-emitting element ED3-2 connected to the (4-1)$^{th}$ pixel circuit PXC4-1.

Each of the (1-1)$^{th}$ to (1-4)$^{th}$ light-emitting elements ED1-1 to ED1-4 may output a first color light (e.g., a green light), each of the (2-1)$^{th}$ and (2-2)$^{th}$ light-emitting elements ED2-1 and ED2-2 may output a second color light (e.g., a red light) different from the first color light, and each of the (3-1)$^{th}$ and (3-2)$^{th}$ light-emitting elements ED3-1 and ED3-2 may output a third color light (e.g., a blue light) different from the first and second color lights.

The (2-1)$^{th}$ light-emitting element ED2-1 and the (3-2)$^{th}$ light-emitting element ED3-2 may be alternately arranged in the second direction DR2, and the (1-1)$^{th}$ light-emitting element ED1-1 and the (1-3)$^{th}$ light-emitting element ED1-3 may be alternately arranged in the second direction DR2. The (2-1)$^{th}$ light-emitting element ED2-1 and the (1-1)$^{th}$ light-emitting element ED1-1 may be spaced apart from each other in a fourth direction DR4, and the (3-2)$^{th}$ light-emitting element ED3-2 and the (1-3)$^{th}$ light-emitting element ED1-3 may be spaced apart from each other in the fourth direction DR4. The fourth direction DR4 may be a direction between the first and second directions DR1 and DR2. The (3-1)$^{th}$ light-emitting element ED3-1 and the (2-2)$^{th}$ light-emitting element ED2-2 may be alternately arranged in the second direction DR2, and the (1-2)$^{th}$ light-emitting element ED1-2 and the (1-4)$^{th}$ light-emitting element ED1-4 may be alternately arranged in the second direction DR2. The (3-1)$^{th}$ light-emitting element ED3-1 and the (1-2)$^{th}$ light-emitting element ED1-2 may be spaced apart from each other in the fourth direction DR4, and the (2-2)$^{th}$ light-emitting element ED2-2 and the (1-4)$^{th}$ light-emitting element ED1-4 may be spaced apart from each other in the fourth direction DR4.

In a first column of the first group PXG1, the (2-1)$^{th}$ light-emitting element ED2-1 and the (3-1)$^{th}$ light-emitting element ED3-1 may be alternately arranged in the first direction DR1, and in a third column of the first group PXG1, the (3-2)$^{th}$ light-emitting element ED3-2 and the (2-2)$^{th}$ light-emitting element ED2-2 may be alternately arranged in the first direction DR1. In a second column of the first group PXG1, the (1-1)$^{th}$ light-emitting element ED1-1 and the (1-2)$^{th}$ light-emitting element ED1-2 may be alternately arranged in the first direction DR1, and in a fourth column of the first group PXG1, the (1-3)$^{th}$ light-emitting element ED1-3 and the (1-4)$^{th}$ light-emitting element ED1-4 may be alternately arranged in the first direction DR1.

The (1-1)$^{th}$ pixel circuit PXC1-1 and the (1-2)$^{th}$ pixel circuit PXC1-2 connected to the first data line DL1 may be alternately arranged in the first direction DR1, and the (2-1)$^{th}$ pixel circuit PXC2-1 and the (2-2)$^{th}$ pixel circuit PXC2-2 connected to the second data line DL2 may be alternately arranged in the first direction DR1. The (3-1)$^{th}$ pixel circuit PXC3-1 and the (3-2)$^{th}$ pixel circuit PXC3-2 may be alternately arranged in the first direction DR1, and the (4-1)$^{th}$ pixel circuit PXC4-1 and the (4-2)$^{th}$ pixel circuit PXC4-2 may be alternately arranged in the first direction DR1.

The first to fourth data lines DL1 to DL4 may receive first to fourth data signals DS1 to DS4 from the data driver 200 (see FIG. 4), respectively. In a first mode, each of the first to fourth data signals may have a voltage level corresponding to the image signal RGB (see FIG. 4). The first group PXG1 may control the amounts of currents flowing in the light-emitting elements ED1-1 to ED1-4, ED2-1, ED2-2, ED3-1, and ED3-2 included in the first to third pixels in response to the first to fourth data signals DS1 to DS4.

Figure 6:
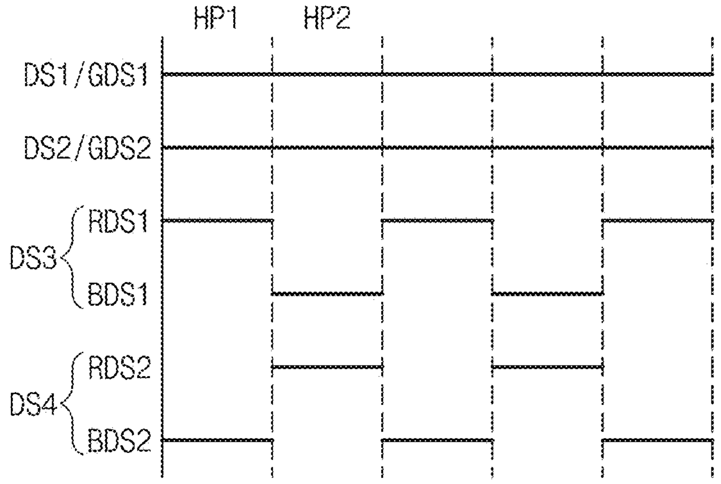
FIG. 6 is a waveform diagram illustrating data signals transmitted to first to fourth data lines of FIG. 5 in a first mode.

FIG. 6 is a waveform diagram illustrating data signals transmitted to first to fourth data lines of FIG. 5 in the first mode.

Referring to FIGS. 5 and 6, in the first mode, the first data signal DS1 applied to the first data line DL1 includes a first green data signal GDS1, and the second data signal DS2 applied to the second data line DL2 includes a second green data signal GDS2. In the first mode, the third data signal DS3 applied to the third data line DL3 includes a first red data signal RDS1 and a first blue data signal BDS1, and the fourth data signal DS4 applied to the fourth data line DL4 includes a second red data signal RDS2 and a second blue data signal BDS2. Each of the first and second green data signals GDS1 and GDS2, the first and second red data signals RDS1 and RDS2, and the first and second blue data signals BDS1 and BDS2 may be referred to as a valid data signal.

In the first mode, each of the first to third pixels WPX1-1, WPX1-2, WPX2, WPX3, NPX1-1, NPX1-2, NPX2, and NPX3 may receive the valid data signal. When the first to third pixels WPX1-1, WPX1-2, WPX2, WPX3, NPX1-1, NPX1-2, NPX2, and NPX3 receive the valid data signals, one of the first to third color lights corresponding to the valid data signals may be emitted. In this case, the first to third pixels WPX1-1, WPX1-2, WPX2, WPX3, NPX1-1, NPX1-2, NPX2, and NPX3 may be turned on.

When the light-emitting elements ED1-1 to ED1-4 included in the first pixel receive the first or second green data signal GDS1 or GDS2, the light-emitting elements ED1-1 to ED1-4 included in the first pixel may emit the first color light. When the light-emitting elements ED2-1 and ED2-2 included in the second pixel receive the first or second red data signal RDS1 or RDS2, the light-emitting elements ED2-1 and ED2-2 included in the second pixel may emit the second color light. When the light-emitting elements ED3-1 and ED3-2 included in the third pixel receive the first or second blue data signals BDS1 and BDS2, the light-emitting elements ED3-1 and ED3-2 included in the third pixel may emit the third color light.

In the first mode, the first green data signal GDS1 is provided to the (1-1)$^{th}$ and (1-2)$^{th}$ wide pixels WPX1-1 and WPX1-2 through the first data line DL1. In the first mode, the second green data signal GDS2 is provided to the (1-1)$^{th}$ and (1-2)$^{th}$ narrow pixels NPX1-1 and NPX1-2 through the second data line DL2. The first green data signal GDS1 is provided to the (1-1)$^{th}$ wide pixel WPX1-1 during a first horizontal scanning period HP1 and is provided to the (1-2)$^{th}$ wide pixel WPX1-2 during a second horizontal scanning period HP2. The second green data signal GDS2 is provided to the (1-1)$^{th}$ narrow pixel NPX1-1 during the first horizontal scanning period HP1 and is provided to the (1-2)$^{th}$ narrow pixel NPX1-2 during the second horizontal scanning period HP2. In the first mode, the (1-1)$^{th}$ and (1-2)$^{th}$ wide pixels WPX1-1 and WPX1-2 are turned on by the first green data signal GDS1, and the (1-1)$^{th}$ and (1-2)$^{th}$ narrow pixels NPX1-1 and NPX1-2 are turned on by the second green data signal GDS2. The first green data signal GDS1 may be referred to as a first valid data signal, and the second green data signal GDS2 may be referred to as a second valid data signal.

In the first mode, the first red data signal RDS1 and the first blue data signal BDS1 are provided to the second and third wide pixels WPX2 and WPX3 through the third data line DL3. In the first mode, the second blue data signal BDS2 and the second red data signal RDS2 are provided to the second and third narrow pixels NPX2 and NPX3 through the fourth data line DL4. The first red data signal RDS1 is provided to the second wide pixel WPX2 during the first horizontal scanning period HP1, and the first blue data signal BDS1 is provided to the third wide pixel WPX3 during the second horizontal scanning period HP2. The second blue data signal BDS2 is provided to the third narrow pixel NPX3 during the first horizontal scanning period HP1, and the second red data signal RDS2 is provided to the second narrow pixel NPX2 during the second horizontal scanning period HP2. In the first mode, the second and third wide pixels WPX2 and WPX3 are turned on by the first red data signal RDS1 and the first blue data signals BDS1, and the third and second narrow pixels NPX3 and NPX2 are turned on by the second blue data signal BDS2 and the second red data signal RDS2.

Because the first and second data lines DL1 and DL2 transmit the first and second green data signals GDS1 and GDS2 including green color information, color information of the data signals applied to the first and second data lines DL1 and DL2 may not be changed over time.

Figure 7:
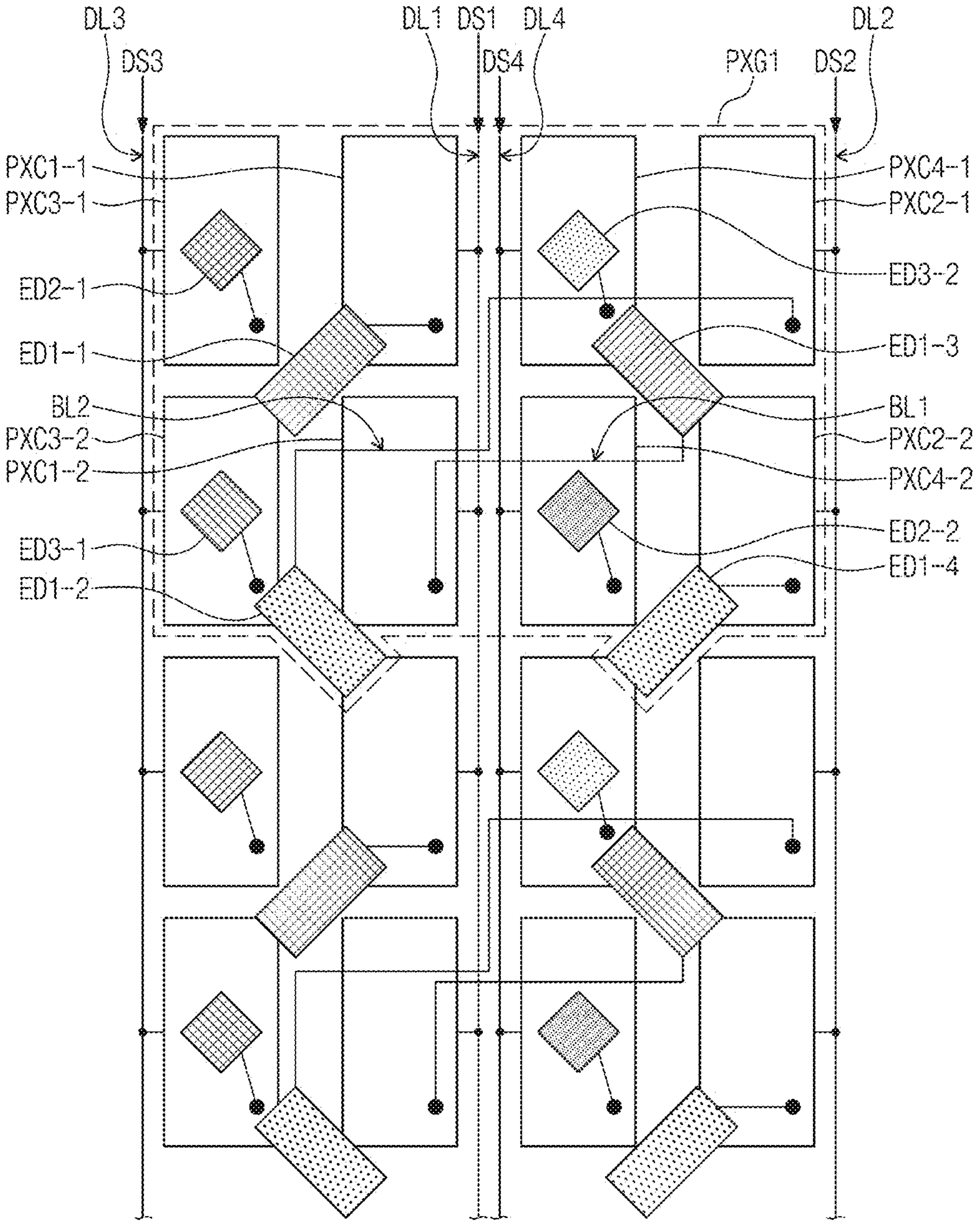
FIG. 7 is a block diagram of the pixels when the pixels of FIG. 5 are driven in a second mode.
Figure 8:
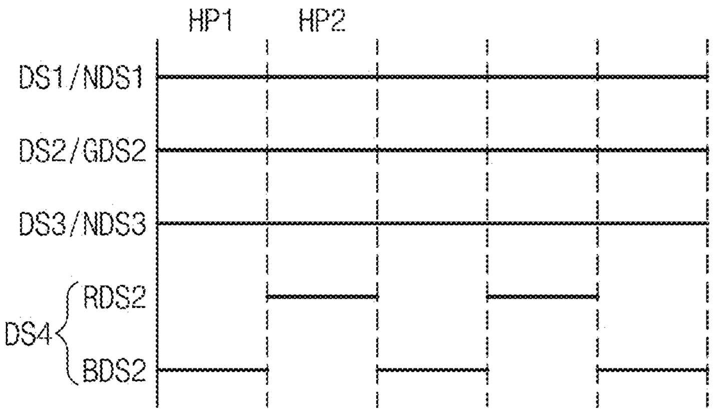
FIG. 8 is a waveform diagram illustrating data signals transmitted to first to fourth data lines of FIG. 7 in the second mode.

FIG. 7 is a block diagram of the pixels when the pixels of FIG. 5 are driven in a second mode. FIG. 8 is a waveform diagram illustrating data signals transmitted to first to fourth data lines of FIG. 7 in the second mode. The configuration of the pixels and pixel circuits of FIG. 7 is same as the configuration of the pixels and pixel circuits of FIG. 5.

Referring to FIGS. 7 and 8, in the second mode, a first black data signal NDS1 may be transmitted to the first data line DL1, and the second green data signal GDS2 may be transmitted to the second data line DL2. In the second mode, a third black data signal NDS3 may be transmitted to the third data line DL3, and the second blue data signal BDS2 and the second red data signal RDS2 may be alternately transmitted to the fourth data line DL4. Each of the second green data signal GDS2, the second red data signal RDS2, and the second blue data signal BDS2 may be referred to as a valid data signal, and the first and third black data signals NDS1 and NDS3 may be referred to as invalid data signals. The first and third black data signals NDS1 and NDS3 may have voltage levels corresponding to black grayscale.

In the second mode, each of the first to third pixels WPX1-1, WPX1-2, WPX2, WPX3, NPX1-1, NPX1-2, NPX2, and NPX3 may receive the valid data signal or the invalid data signal. When the first to third pixels WPX1-1, WPX1-2, WPX2, WPX3, NPX1-1, NPX1-2, NPX2, and NPX3 receive the invalid data signal, the light-emitting elements ED1-1 to ED1-4, ED2-1, ED2-2, ED3-1, and ED3-2 may display the black grayscale. In this case, the first to third pixels WPX1-1, WPX1-2, WPX2, WPX3, NPX1-1, NPX1-2, NPX2, and NPX3 may be turned off. A state in which the first to third pixels WPX1-1 to WPX3 and NPX1-1 to NPX3 are turned on may be referred to as a first state, and a state in which the first to third pixels WPX1-1, WPX1-2, WPX2, WPX3, NPX1-1, NPX1-2, NPX2, and NPX3 are turned off may be referred to as a second state.

In the second mode, the first black data signal NDS1 is provided to the (1-1)$_{th}$ and (1-2)$^{th}$ wide pixels WPX1-1 and WPX1-2 through the first data line DL1. The second green data signal GDS2 is provided to the (1-1)$^{th}$ and (1-2)$^{th}$ narrow pixels NPX1-1 and NPX1-2 through the second data line DL2. The first black data signal NDS1 is provided to the (1-1)$^{th}$ wide pixel WPX1-1 during the first horizontal scanning period HP1, and is provided to the (1-2)$^{th}$ wide pixel WPX1-2 during the second horizontal scanning period HP2. The second green data signal GDS2 is provided to the (1-1)$^{th}$ narrow pixel NPX1-1 during the first horizontal scanning period HP1, and is provided to the (1-2)$^{th}$ narrow pixel NPX1-2 during the second horizontal scanning period HP2. The (1-1)$^{th}$ and (1-2)$^{th}$ wide pixels WPX1-1 and WPX1-2 are turned off by the first black data signal NDS1, and the (1-1)$^{th}$ and (1-2)$^{th}$ narrow pixels NPX1-1 and NPX1-2 are turned on by the second green data signal GDS2.

In the second mode, the third black data signal NDS3 is provided to the second and third wide pixels WPX2 and WPX3 through the third data line DL3. The second blue data signal BDS2 and the second red data signal RDS2 are provided to the third and second narrow pixels NPX3 and NPX2 through the fourth data line DL4. The third black data signal NDS3 is provided to the second wide pixel WPX2 during the first horizontal scanning period HP1, and is provided to the third wide pixel WPX3 during the second horizontal scanning period HP2. The second blue data signal BDS2 is provided to the third narrow pixel NPX3 during the first horizontal scanning period HP1, and the second red data signal RDS2 is provided to the second narrow pixel NPX2 during the second horizontal scanning period HP2. In the second mode, the second and third wide pixels WPX2 and WPX3 are turned off by the third black data signal NDS3, and the third and second narrow pixels NPX3 and NPX2 are turned on by the second blue data signal BDS2 and the second red data signal RDS2.

The first data line DL1 may transmit the first green data signal GDS1 (see FIG. 6) when the display device DD operates in the first mode, and may transmit the first black data signal NDS1 when the display device DD operates in the second mode. The second data line DL2 may transmit the second green data signal GDS2 regardless of whether the display device DD operates in the first mode or the second mode. The third data line DL3 may transmit the first red data signal RDS1 and the first blue data signal BDS1 (see FIG. 6) when the display device DD operates in the first mode, and may transmit the third black data signal NDS3 when the display device DD operates in the second mode. The fourth data line DL4 may alternately transmit the second blue data signal BDS2 and the second red data signal RDS2 regardless of whether the display device DD operates in the first mode or the second mode.

When the wide pixel and the narrow pixel are connected to the one data line, the black data signal and the green data signal may be alternately applied in units of one horizontal scanning section. However, because only the $(1\text{-}1)^{th}$ and $(1\text{-}2)^{th}$ wide pixels WPX1-1 and WPX1-2 are connected to the first data line DL1, in the second mode, only the first black data signal NDS1 may be provided to the first data line DL1. That is, when only the wide pixels are connected to the first data line DL1 and only the narrow pixels are connected to the second data line DL2, the valid data signal and the invalid data signal may not swing in units of one horizontal scanning section, and as a result, power consumption may be decreased.

Figure 9:
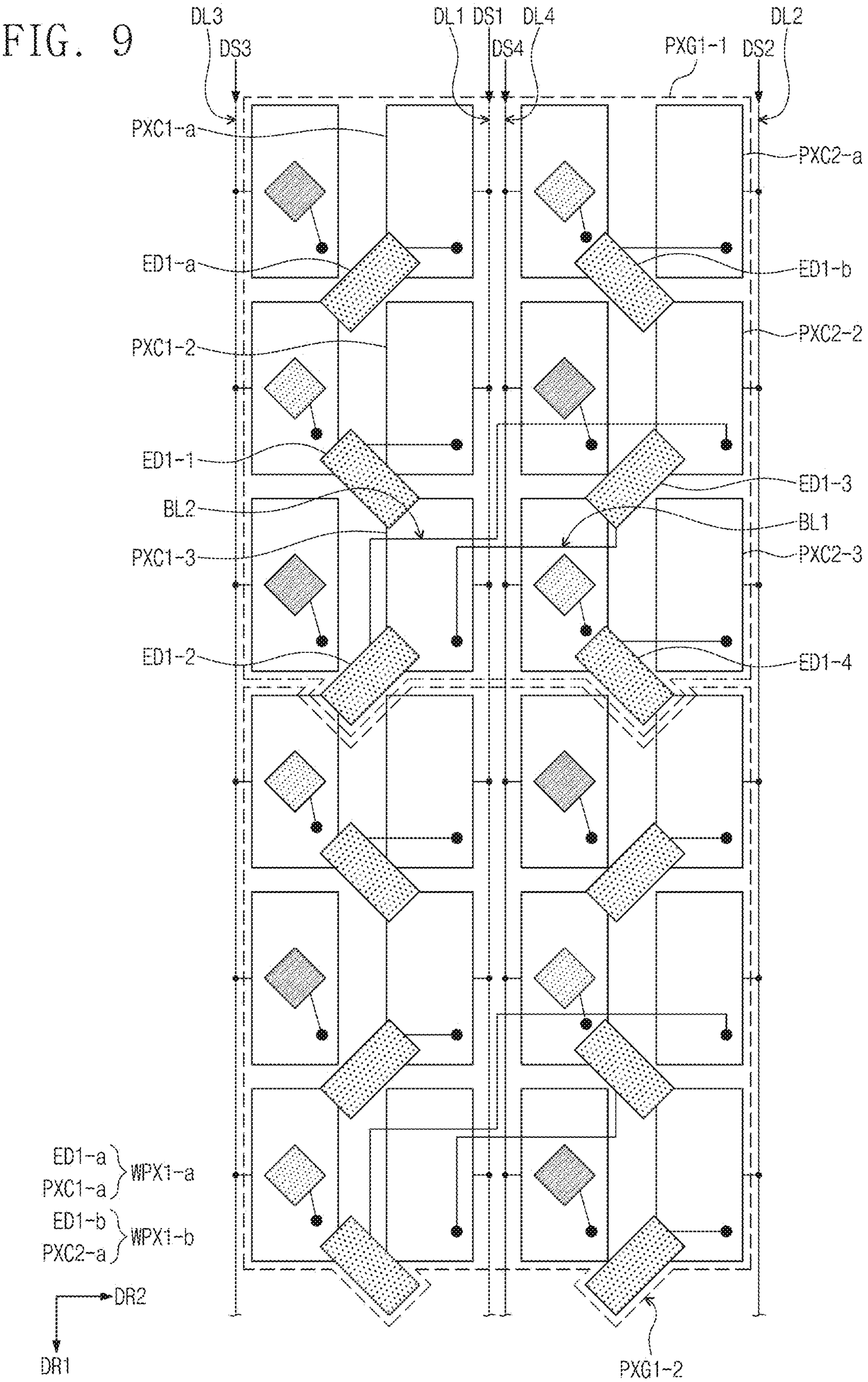
FIG. 9 is a block diagram of the pixels according to one or more embodiments of the present disclosure.
Figure 10:
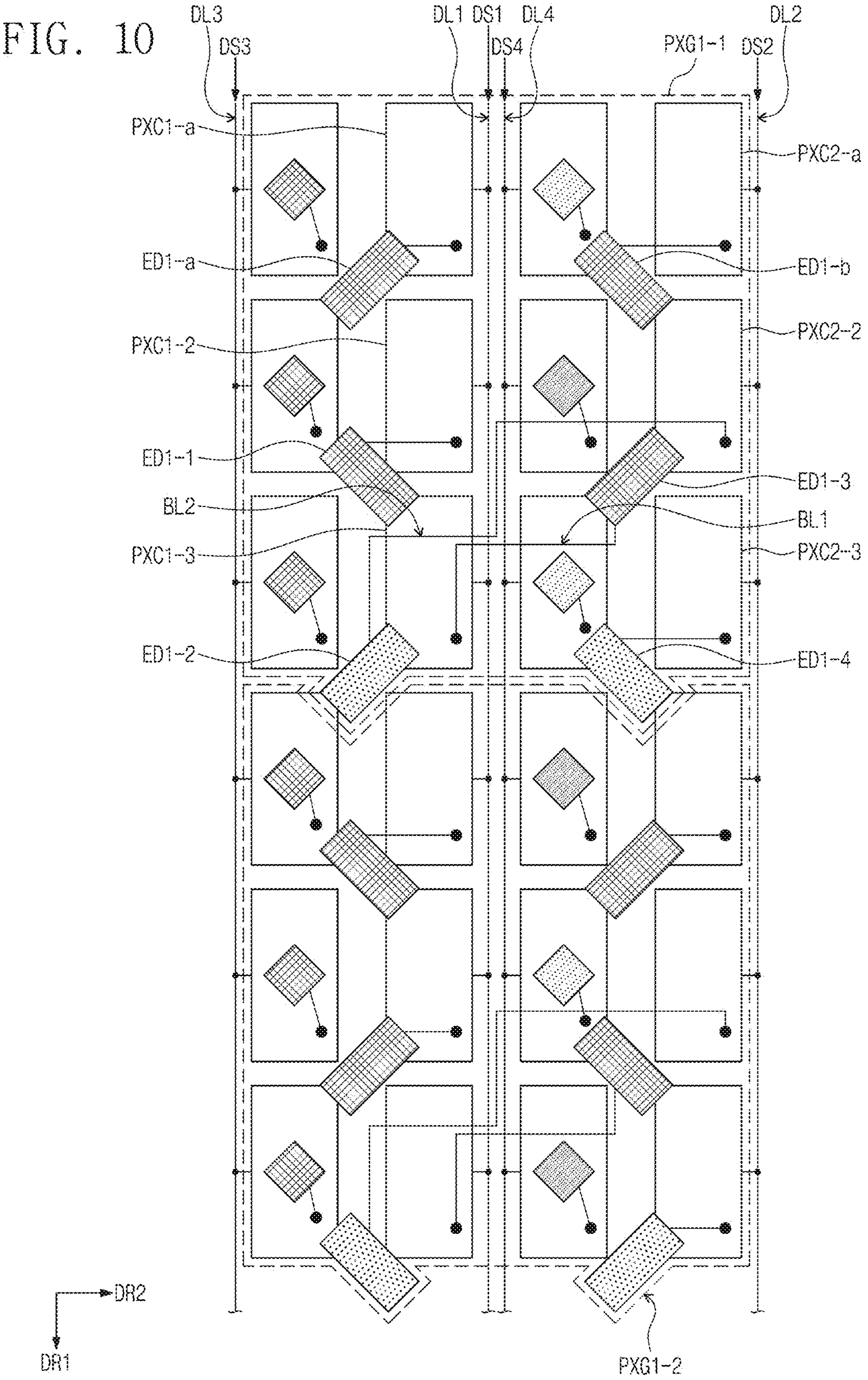
FIG. 10 is a block diagram of the pixels according to one or more embodiments of the present disclosure.
Figure 11:
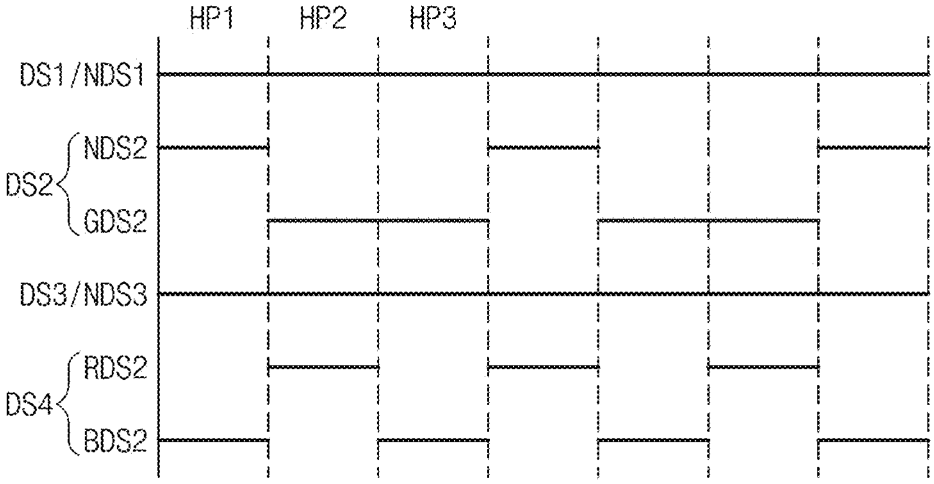
FIG. 11 is a waveform diagram illustrating data signals transmitted to first to fourth data lines of FIG. 10 in the second mode.

FIG. 9 is a block diagram of the pixels according to one or more embodiments of the present disclosure. FIG. 10 is a block diagram of the pixels according to one or more embodiments of the present disclosure. FIG. 11 is a waveform diagram illustrating data signals transmitted to first to fourth data lines of FIG. 10 in the second mode.

Referring to FIGS. 9 and 10, the plurality of pixels may be grouped into the $(1\text{-}1)^{th}$ and $(1\text{-}2)^{th}$ groups PXG1-1 and PXG1-2. The $(1\text{-}1)^{th}$ and $(1\text{-}2)^{th}$ groups PXG1-1 and PXG1-2 are alternately arranged in the first direction DR1. The $(1\text{-}1)^{th}$ group PXG1-1 is arranged in the second direction DR2, and the $(1\text{-}2)^{th}$ group PXG1-2 is arranged in the second direction DR2. Each of the $(1\text{-}1)^{th}$ and $(1\text{-}2)^{th}$ groups PXG1-1 and PXG1-2 may include six first pixels, three second pixels, and three third pixels. The $(1\text{-}1)^{th}$ and $(1\text{-}2)^{th}$ groups PXG1-1 and PXG1-2 may further include two first pixels, one second pixel, and one third pixel in addition to the first group PXG1 (see FIG. 5). The two added first pixels are referred to as a $(1\text{-a})^{th}$ wide pixel WPX1-*a* and a $(1\text{-b})^{th}$ wide pixel WPX1-*b*. Because the second and third pixels illustrated in FIGS. 9 and 10 are arranged in a similar structure to that of the second and third pixels illustrated in FIGS. 5 and 7, a description of the second and third pixels will be omitted.

The first to fourth data lines DL1 to DL4 are connected to the $(1\text{-}1)^{th}$ group PXG1-1 and the $(1\text{-}2)^{th}$ group PXG1-2. The $(1\text{-a})^{th}$, $(1\text{-}1)^{th}$, and $(1\text{-}2)^{th}$ wide pixels WPX1-*a*, WPX1-1, and WPX1-2 are connected to the first data line DL1, and the $(1\text{-b})^{th}$ wide pixel WPX1-*b*, and the $(1\text{-}1)^{th}$ and $(1\text{-}2)^{th}$ narrow pixels NPX1-1 and NPX1-2 are connected to the second data line DL2.

The $(1\text{-a})^{th}$ wide pixel WPX1-*a* includes a $(1\text{-a})^{th}$ pixel circuit PXC1-*a* connected to the first data line DL1, and a $(1\text{-a})^{th}$ light-emitting element ED1-*a* connected to the $(1\text{-a})^{th}$ pixel circuit PXC1-*a*. The $(1\text{-b})^{th}$ wide pixel WPX1-*b* includes a $(2\text{-a})^{th}$ pixel circuit PXC2-*a* connected to the second data line DL2, and a $(1\text{-b})^{th}$ light-emitting element ED1-*b* connected to the $(2\text{-a})^{th}$ pixel circuit PXC2-*a*

Referring to FIGS. 10 and 11, in the second mode, the first data signal DS1 applied to the first data line DL1 includes the first black data signal NDS1, and the second data signal DS2 applied to the second data line DL2 includes a second black data signal NDS2 and the second green data signal GDS2. The third data signal DS3 applied to the third data line DL3 includes the third black data signal NDS3, and the fourth data signal DS4 applied to the fourth data line DL4 includes the second blue data signal BDS2 and the second red data signal RDS2. Here, the second green data signal GDS2, the second blue data signal BDS2, and the second red data signal RDS2 are referred to as valid data signals, and the first to third black data signals NDS1 to NDS3 are referred to as invalid data signals.

In the second mode, the first black data signal NDS1 is provided to the $(1\text{-a})^{th}$, $(1\text{-}1)^{th}$, and $(1\text{-}2)^{th}$ wide pixels WPX1-*a*, WPX1-1, and WPX1-2 through the first data line DL1. The second black data signal NDS2 and the second green data signal GDS2 are respectively provided to the $(1\text{-b})^{th}$ wide pixel WPX1-*b* and the $(1\text{-}1)^{th}$ and $(1\text{-}2)^{th}$ narrow pixels NPX1-1 and NPX1-2 through the second data line DL2. The first black data signal NDS1 is provided to the $(1\text{-a})^{th}$ wide pixel WPX1-*a* during the first horizontal scanning period HP1, is provided to the $(1\text{-}1)^{th}$ wide pixel WPX1-1 during the second horizontal scanning period HP2, and is provided to the $(1\text{-}2)^{th}$ wide pixel WPX1-2 during a third horizontal scanning period HP3. The second black data signal NDS2 is provided to the $(1\text{-b})^{th}$ wide pixel WPX1-*b* during the first horizontal scanning period HP1, the second green data signal GDS2 is provided to the $(1\text{-}1)^{th}$ narrow pixel NPX1-1 during the second horizontal scanning period HP2, and the second black data signal NDS2 is provided to the $(1\text{-}2)^{th}$ narrow pixel NPX1-2 during the third horizontal scanning period HP3. The (1-a) th, $(1\text{-}1)^{th}$, and $(1\text{-}2)^{th}$ wide pixels WPX1-*a*, WPX1-1, and WPX1-2 are turned off by the first black data signal NDS1, the $(1\text{-b})^{th}$ wide pixel WPX1-*b* is turned off by the second black data signal NDS2, and the $(1\text{-}1)^{th}$ and $(1\text{-}2)^{th}$ narrow pixels NPX1-1 and NPX1-2 are turned on by the second green data signal GDS2.

FIGS. 9 and 10 illustrate a structure in which a plurality of pixels, including two wide pixels and one narrow pixel, are alternately arranged in the first direction DR1, but the present disclosure is not limited thereto. For example, in the plurality of pixels, "i" wide pixels and "j" narrow pixels are alternately and repeatedly arranged in the first direction DR1. Alternatively, in the plurality of pixels, "k" second pixels and "l" third pixels may be alternately and repeatedly arranged in the second direction DR2, or "l" second pixels and "k" third pixels may be alternately and repeatedly arranged in the second direction DR2. Here, "i," "j", "k," and "l" may each be a respective integer of 2 or more.

Figure 12:
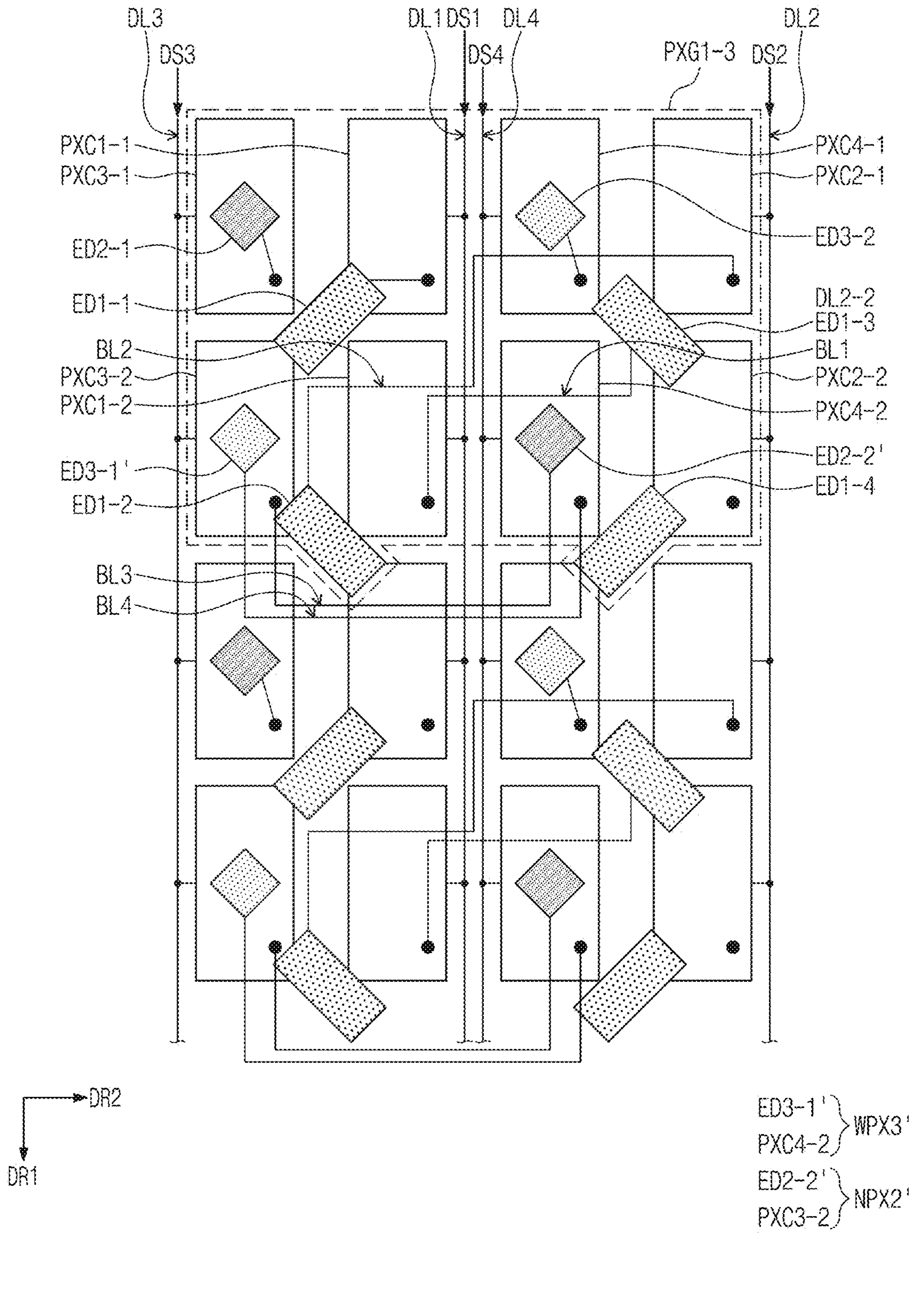
FIG. 12 is a block diagram of the pixels according to one or more embodiments of the present disclosure.
Figure 13:
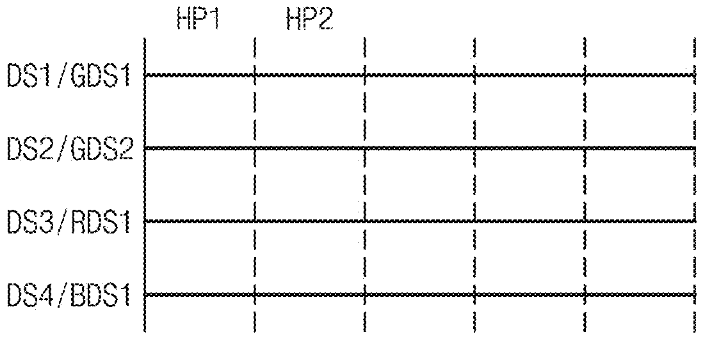
FIG. 13 is a waveform diagram illustrating data signals transmitted to first to fourth data lines of FIG. 12 in the first mode.

FIG. 12 is a block diagram of the pixels according to one or more embodiments of the present disclosure. FIG. 13 is a waveform diagram illustrating data signals transmitted to first to fourth data lines of FIG. 12 in the first mode.

Referring to FIGS. 12 and 13, the plurality of pixels may be arranged in the first and second directions DR1 and DR2 in units of $(1\text{-}3)^{th}$ groups PXG1-3. The $(1\text{-}3)^{th}$ group PXG1-3 may include four first pixels, two second pixels, and two third pixels. The four first pixels include two first wide pixels and two first narrow pixels. The two first wide pixels are referred to as the $(1\text{-}1)^{th}$ wide pixel WPX1-1 and the $(1\text{-}2)^{th}$ wide pixel WPX1-2, and the two first narrow pixels are referred to as the $(1\text{-}1)^{th}$ narrow pixel NPX1-1 and the $(1\text{-}2)^{th}$ narrow pixel NPX1-2. The two second pixels include the one second wide pixel WPX2 and one second narrow pixel NPX2', and the two third pixels include one third wide pixel WPX3' and the one third narrow pixel NPX3.

The third wide pixel WPX3' includes the $(4\text{-}2)^{th}$ pixel circuit PXC4-2 connected to the fourth data line DL4, and a $(3\text{-}1)^{th}$ light-emitting element ED3-1' connected to the $(4\text{-}2)^{th}$ pixel circuit PXC4-2, and the second narrow pixel NPX2' includes the $(3\text{-}2)^{th}$ pixel circuit PXC3-2 connected to the third data line DL3, and a $(2\text{-}2)^{th}$ light-emitting element ED2-2' connected to the $(3\text{-}2)^{th}$ pixel circuit PXC3-2.

The $(3\text{-}2)^{th}$ pixel circuit PXC3-2 connected to the third data line DL3 and the $(2\text{-}2)^{th}$ light-emitting element ED2-2' may be connected to each other through a third bridge line BL3. The third bridge line BL3 may cross the first data line DL1. The (4-2)$^{th}$ pixel circuit PXC4-2 and the (3-1)$^{th}$ light-emitting element ED3-1 connected to the fourth data line DL4 may be connected to each other through a fourth bridge line BL4. The fourth bridge line BL4 may cross the first data line DL1. The third and fourth bridge lines BL3 and BL4 may further cross the fourth data line DL4.

In one or more embodiments of the present disclosure, in the first mode, the first data signal DS1 applied to the first data line DL1 includes the first green data signal GDS1, and the second data signal DS2 applied to the second data line DL2 includes the second green data signal GDS2. In the first mode, the third data signal DS3 applied to the third data line DL3 includes the first red data signal RDS1, and the fourth data signal DS4 applied to the fourth data line DL4 includes the first blue data signal BDS1.

The first to fourth data signals DS1 to DS4 include data signals each having one color information in the first and second horizontal scanning sections HP1 and HP2. In the first mode, the first green data signal GDS1 is provided to the (1-1)$^{th}$ and (1-2)$^{th}$ wide pixels WPX1-1 and WPX1-2 through the first data line DL1, and the second green data signal GDS2 is provided to the (1-1)$^{th}$ and (1-2)$^{th}$ narrow pixels NPX1-1 and NPX1-2 through the second data line DL2. In the first mode, the first red data signal RDS1 is provided to the second wide pixel WPX2 and the second narrow pixel NPX2 through the third data line DL3, and the first blue data signal BDS1 is provided to the third wide pixel WPX3 and the third narrow pixel NPX3 through the fourth data line DL4.

In the first mode, the first data line DL1 may be connected only to the first pixel that outputs the first color light to provide only the first green data signal GDS1, and the second data line DL2 may be connected only to the first pixel that outputs the first color light to provide only the second green data signal GDS2. In the first mode, the third data line DL3 may be connected only to the second pixel that outputs the second color light to provide only the first red data signal RDS1, and the fourth data line DL4 may be connected only to the third pixel that outputs the third color light to provide only the first blue data signal BDS1. Thus, the third and fourth data lines DL3 and DL4 may provide only a data signal having one color information without changing color information of the transmitted data signal over time, thereby reducing power consumption.

Figure 14:
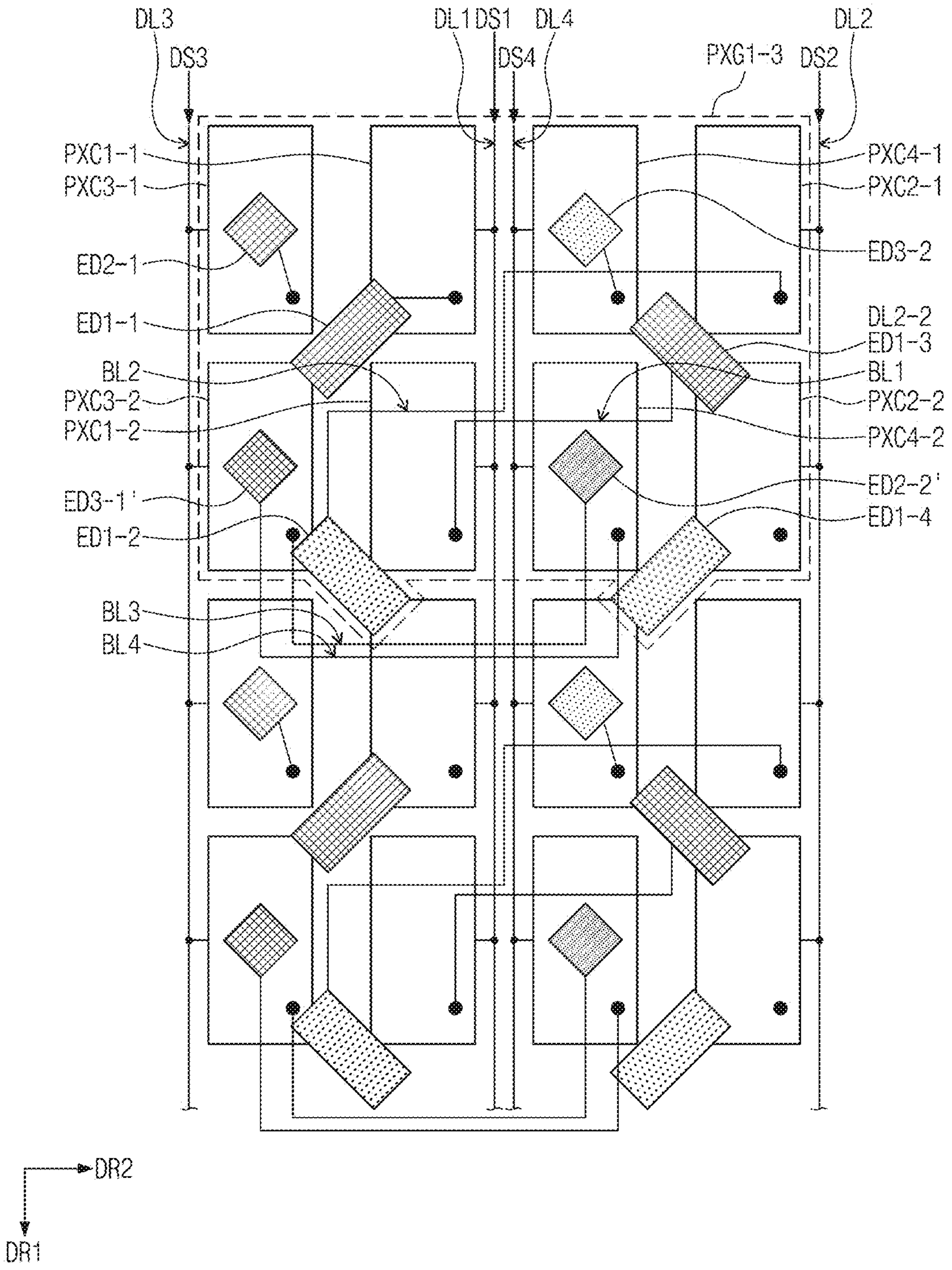
FIG. 14 is a block diagram of the pixels according to one or more embodiments of the present disclosure.
Figure 15:
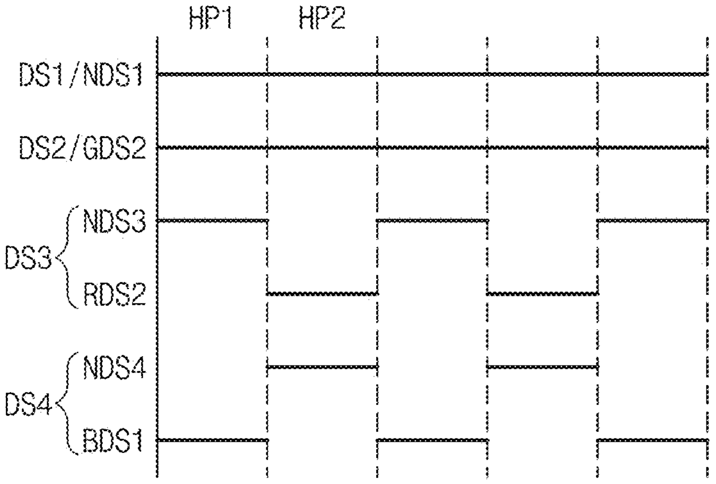
FIG. 15 is a waveform diagram illustrating data signals transmitted to first to fourth data lines of FIG. 14 in the second mode.

FIG. 14 is a block diagram of the pixels according to one or more embodiments of the present disclosure. FIG. 15 is a waveform diagram illustrating data signals transmitted to first to fourth data lines of FIG. 14 in the second mode.

Referring to FIGS. 14 and 15, in the second mode, operation of the first and second data lines DL1 and DL2 for the (1-3)$^{th}$ group PXG1-3 is the same as operation of the first and second data lines DL1 and DL2 for the first group PXG1.

In one or more embodiments of the present disclosure, in the second mode, the first data signal DS1 applied to the first data line DL1 includes the first black data signal NDS1, and the second data signal DS2 applied to the second data line DL2 includes the second green data signal GDS2. In the second mode, the third data signal DS3 applied to the third data line DL3 includes the third black data signal NDS3 and the second red data signal RDS2, and the fourth data signal DS4 applied to the fourth data line DL4 includes a fourth black data signal NDS4 and the first blue data signal BDS1. The fourth black data signal NDS4 may be referred to as an invalid data signal. The fourth black data signal NDS4 may have a voltage level corresponding to a black grayscale.

In the second mode, the third black data signal NDS3 and the second red data signal RDS2 are alternately provided to the second wide pixel WPX2 and a second narrow pixel NPX2' through the third data line DL3. In the second mode, the first blue data signal BDS1 and the fourth black data signal NDS4 are provided to the third narrow pixel NPX3 and the third wide pixel WPX3' through the fourth data line DL4. The third black data signal NDS3 is provided to the second wide pixel WPX2 during the first horizontal scanning period HP1, and the second red data signal RDS2 is provided to the second narrow pixel NPX2' during the second horizontal scanning period HP2. The first blue data signal BDS1 is provided to the third narrow pixel NPX3 during the first horizontal scanning period HP1, and the fourth black data signal NDS4 is provided to the third wide pixel WPX3' during the second horizontal scanning period HP2. In the second mode, the second and third wide pixels WPX2 and WPX3' are turned off by the third and fourth black data signals NDS3 and NDS4, and the third and second narrow pixels NPX3 and NPX2' are turned on by the first blue data signal BDS1 and the second red data signal RDS2.

In the second mode, the third and fourth data lines DL3 and DL4 alternately provide two data signals having different color information, and thus power consumption may be increased. Here, the first and second data lines DL1 and DL2 may provide only one data signal to decrease power consumption, and thus the increase in the power consumption due to the third and fourth data lines DL3 and DL4 may be canceled.

Figure 16:
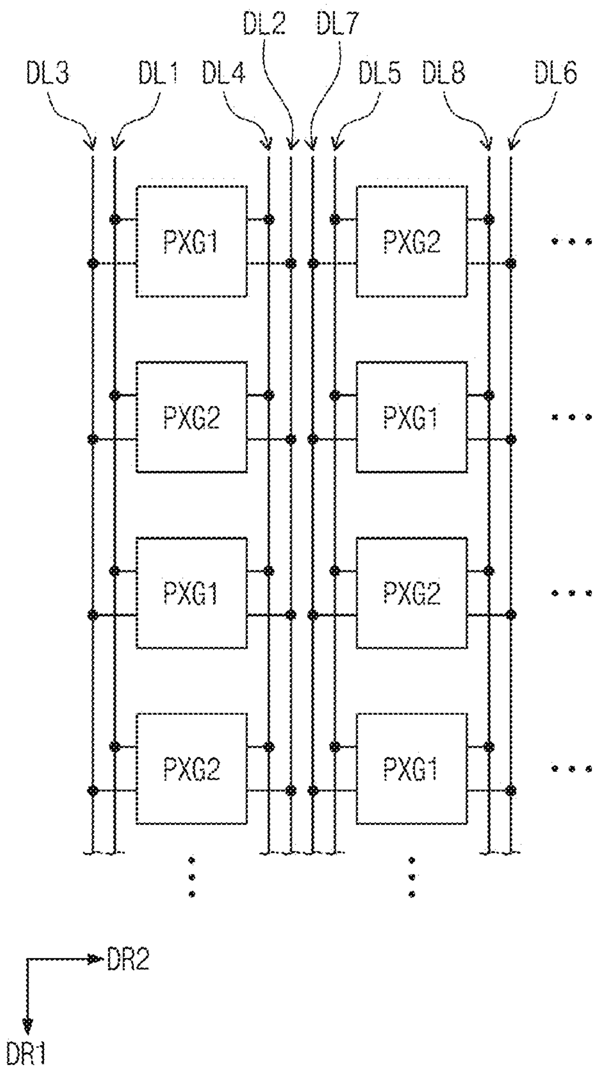
FIG. 16 is a block diagram of a pixel group according to one or more embodiments of the present disclosure.
Figure 17:
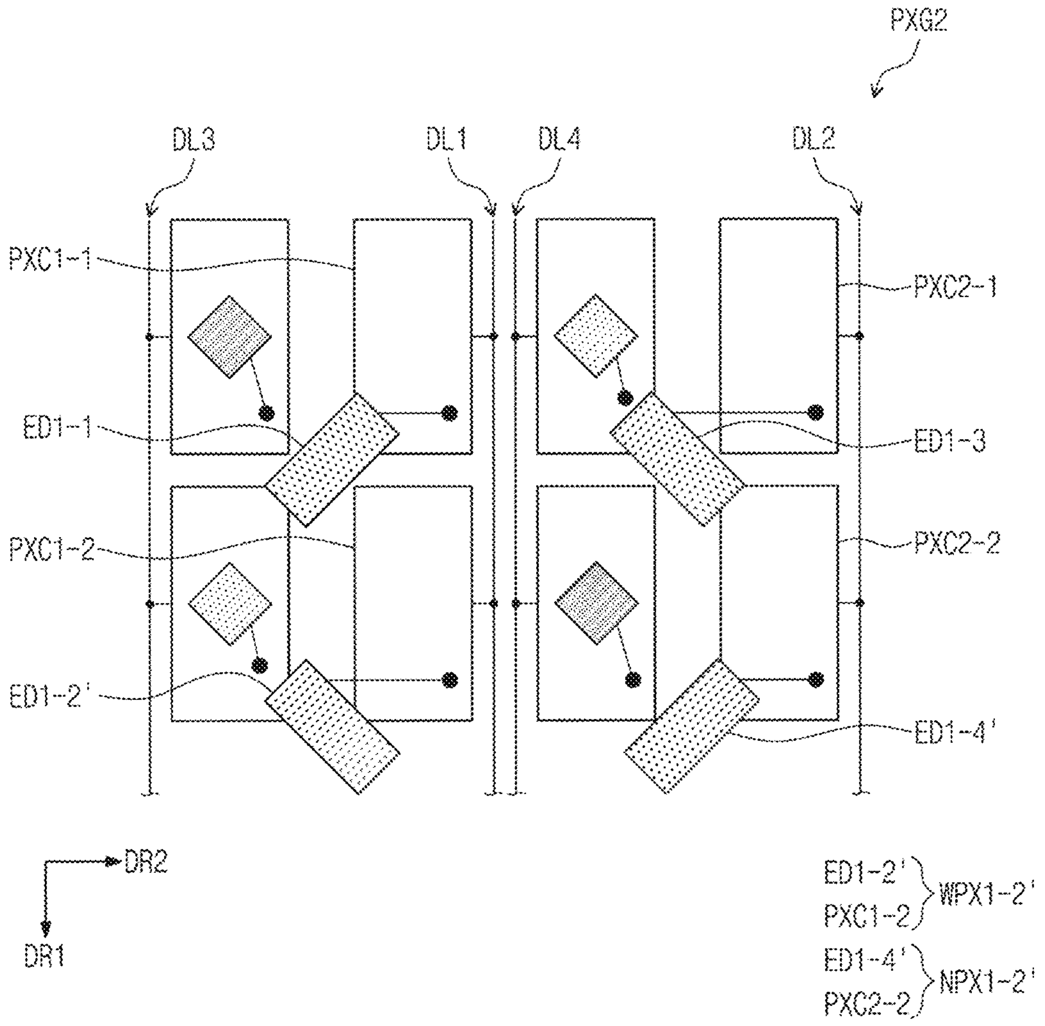
FIG. 17 is a block diagram of the pixels according to one or more embodiments of the present disclosure.

FIG. 16 is a block diagram of a pixel group according to one or more embodiments of the present disclosure. FIG. 17 is a block diagram of the pixels according to one or more embodiments of the present disclosure.

Referring to FIG. 16, the first group PXG1 and the second group PXG2 may be alternately arranged in the first and second directions DR1 and DR2. The configuration of the first group PXG1 illustrated in FIG. 16 is the same as the configuration of the first group PXG1 in FIG. 5.

Each of the first and second groups PXG1 and PXG2 may be connected to four data lines. When the first and second groups PXG1 and PXG2 are alternately arranged in the first direction DR1, both the first and second groups PXG1 and PXG2 arranged in the first direction DR1 may be connected to the same data line. When the first and second groups PXG1 and PXG2 are alternately arranged in the second direction DR2, both the first and second groups PXG1 and PXG2 may be connected to different data lines. For example, the first and second groups PXG1 and PXG2 positioned in a first column may be connected to the first to fourth data lines DL1 to DL4, and the first and second groups PXG1 and PXG2 positioned on a second column adjacent to the first column in the second direction DR2 may be connected to fifth to eighth data lines DL5 to DL8.

Referring to FIG. 17, the second group PXG2 may include four first pixels, two second pixels, and two third pixels. The four first pixels include two first wide pixels and two first narrow pixels. The two first wide pixels are referred to as the (1-1)$^{th}$ wide pixel WPX1-1 and a (1-2)$^{th}$ wide pixel WPX1-2', and the two first narrow pixels are referred to as the (1-1)$^{th}$ narrow pixel NPX1-1 and a (1-2)$^{th}$ narrow pixel NPX1-2'. The two second pixels include the one second wide pixel WPX2 and the one second narrow pixel NPX2, and the two third pixels include the one third wide pixel WPX3 and the one third narrow pixel NPX3.

The (1-2)$^{th}$ wide pixel WPX1-2' includes the (1-2)$^{th}$ pixel circuit PXC1-2 connected to the first data line DL1, and a (1-2)$^{th}$ light-emitting element ED1-2' connected to the (1-2)$^{th}$ pixel circuit PXC1-2. The (1-2)$^{th}$ narrow pixel NPX1-2' includes the (2-2)$^{th}$ pixel circuit PXC2-2 connected to the second data line DL2, and a (1-4)$^{th}$ light-emitting element ED1-4' connected to the (2-2)$^{th}$ pixel circuit PXC2-2.

The (1-3)$^{th}$ light-emitting element ED1-3 of the first group PXG1 is connected to the (1-2)$^{th}$ pixel circuit PXC1-2 through the first bridge line BL1, and the first bridge line BL1 may cross the first data line DL1. A (1-3)$^{th}$ light-emitting element ED1-3' of the second group PXG2 may be connected to the (2-1)$^{th}$ pixel circuit PXC2-1 through a wiring line that does not cross the first data line DL1. The (1-3)$^{th}$ light-emitting element ED1-3' of the second group PXG2 may not cross the first data line DL1, and may be connected to the pixel circuit through a wiring line that is shorter than the first bridge line BL1, and thus influence of the data lines may be decreased. When the wiring line is less affected by the data lines, coupling with the data lines may be reduced, and thus the display device DD having improved display quality may be provided.

Referring back to FIG. 16, the first group PXG1 and the second group PXG2 are alternately arranged in the first and second directions DR1 and DR2. In the first group PXG1, the valid data signal and the invalid data signal do not swing in units of one horizontal scanning section, and thus power consumption may be decreased. In the second group PXG2, influence between the wiring line to which the light-emitting element and the pixel circuit are connected and the data line may be decreased, and thus display quality may be improved. The arrangement of the first group PXG1 and the second group PXG2 shown in FIG. 16 may provide the display device DD having decreased power consumption and improved display quality.

According to the present disclosure, in a first mode, a wide pixel and a narrow pixel are turned on, and in a second mode, the wide pixel is turned off, and the narrow pixel is turned on. A viewing angle of a light output from the narrow pixel is smaller than a viewing angle of a light output from the wide pixel, and thus in the second mode, a display device may output an image having a narrow viewing angle. Thus, a user may control the viewing angle of the display device by selecting the first mode or the second mode depending on a situation.

Further, one data line is connected only to the wide pixel or the narrow pixel. Thus, in the second mode, the data line connected to the wide pixel may not provide a valid data signal and an invalid data signal but provide only the invalid data signal, thus the data signal may not swing in units of horizontal scanning sections, and as a result, power consumption may be decreased.

Although the description has been made above with reference to one or more embodiments of the present disclosure, it may be understood that those skilled in the art or those having ordinary knowledge in the art may variously modify and change the present disclosure without departing from the aspects of the present disclosure described in the appended claims. Thus, the aspects of the present disclosure is not limited to the detailed description of the specification but should be defined by the appended claims, with functional equivalents thereof to be included therein.

What is claimed is:

1. A display device comprising:
a first data line;
a second data line;
a (1-1)$^{th}$ pixel circuit connected to the first data line;
a (2-1)$^{th}$ pixel circuit connected to the second data line;
a (1-1)$^{th}$ light-emitting element connected to the (1-1)$^{th}$ pixel circuit, having a first state in a first mode, and having a second state in a second mode;
a (1-2)$^{th}$ light-emitting element connected to the (2-1)$^{th}$ pixel circuit, and having the first state in the first mode and in the second mode;
a first bridge line crossing the first data line, and connecting the (2-1)$^{th}$ pixel circuit and the (1-2)$^{th}$ light-emitting element;
a (1-2)$^{th}$ pixel circuit connected to the first data line;
a (2-2)$^{th}$ pixel circuit connected to the second data line;
a (1-3)$^{th}$ light-emitting element connected to the (1-2)$^{th}$ pixel circuit, having the first state in the first mode, and having the second state in the second mode;
a (1-4)$^{th}$ light-emitting element connected to the (2-2)$^{th}$ pixel circuit, and having the first state in the first mode and in the second mode; and
a second bridge line crossing the first data line, and connecting the (1-2)$^{th}$ pixel circuit and the (1-3)$^{th}$ light-emitting element,
wherein the (1-1)$^{th}$ light-emitting element and the (1-3)$^{th}$ light-emitting element are in a same first row and are electrically connected to the first data line, and
wherein the (1-2)$^{th}$ light-emitting element and the (1-4)$^{th}$ light-emitting element are in a same second row and are electrically connected to the second data line.

2. The display device of claim 1, wherein the first data line is configured to receive a first valid data signal in the first mode, and is configured to receive an invalid data signal in the second mode, and
wherein the second data line is configured to receive a second valid data signal in the first mode and in the second mode.

3. The display device of claim 2, wherein the invalid data signal has a voltage level corresponding to a black grayscale.

4. The display device of claim 1, wherein the first state is a state in which the (1-1)$^{th}$ light-emitting element and the (1-2)$^{th}$ light-emitting element are turned on, and
wherein the second state is a state in which the (1-1)$^{th}$ light-emitting element is turned off.

5. The display device of claim 1, wherein the first data line and the second data line extend in a first direction, and
wherein the (1-1)$^{th}$ light-emitting element and the (1-2)$^{th}$ light-emitting element are adjacent to each other in the first direction.

6. The display device of claim 1, wherein the first data line and the second data line extend in a first direction, and
wherein "i" (1-1)$^{th}$ light-emitting elements and "j" (1-2)$^{th}$ light-emitting elements are alternately and repeatedly arranged in the first direction, "i" and "j" being a respective integer of 2 or more.

7. The display device of claim 1, wherein the first data line and the second data line extend in a first direction,
wherein the (1-1)$^{th}$ light-emitting element and the (1-2)$^{th}$ light-emitting element are adjacent to each other in the first direction,
wherein the (1-3)$^{th}$ light-emitting element and the (1-4)$^{th}$ light-emitting element are adjacent to each other in the first direction, wherein the (1-1)$^{th}$ light-emitting element and the (1-3)$^{th}$ light-emitting element are adjacent to each other in a second direction crossing the first direction, and wherein the (1-2)$^{th}$ light-emitting element and the (1-4)$^{th}$ light-emitting element are adjacent to each other in the second direction.

8. The display device of claim 1, further comprising:

a third data line;

a fourth data line;

a (3-1)$^{th}$ pixel circuit and a (3-2)$^{th}$ pixel circuit connected to the third data line;

a (4-1)$^{th}$ pixel circuit and a (4-2)$^{th}$ pixel circuit connected to the fourth data line;

a (2-1)$^{th}$ light-emitting element having the first state in the first mode, and having the second state in the second mode;

a (2-2)$^{th}$ light-emitting element having the first state in the first mode and in the second mode;

a (3-1)$^{th}$ light-emitting element having the first state in the first mode, and having the second state in the second mode; and a (3-2)$^{th}$ light-emitting element having the first state in the first mode and in the second mode.

9. The display device of claim 8, wherein the (2-1)$^{th}$ light-emitting element is connected to the (3-1)$^{th}$ pixel circuit, wherein the (2-2)$^{th}$ light-emitting element is connected to the (4-2)$^{th}$ pixel circuit, wherein the (3-1)$^{th}$ light-emitting element is connected to the (3-2)$^{th}$ pixel circuit, and wherein the (3-2)$^{th}$ light-emitting element is connected to the (4-1)$^{th}$ pixel circuit.

10. The display device of claim 8, wherein the (2-1)$^{th}$ light-emitting element is connected to the (3-1)$^{th}$ pixel circuit, wherein the (2-2)$^{th}$ light-emitting element is connected to the (3-2)$^{th}$ pixel circuit, wherein the (3-1)$^{th}$ light-emitting element is connected to the (4-2)$^{th}$ pixel circuit, and wherein the (3-2)$^{th}$ light-emitting element is connected to the (4-1)$^{th}$ pixel circuit.

11. The display device of claim 10, further comprising:

a third bridge line crossing the first data line, and connecting the (3-2)$^{th}$ pixel circuit and the (2-2)$^{th}$ light-emitting element; and a fourth bridge line crossing the first data line, and connecting the (4-2)$^{th}$ pixel circuit and the (3-1)$^{th}$ light-emitting element.

12. The display device of claim 8, wherein the third data line is configured to receive a third valid data signal in the first mode, and is configured to receive an invalid data signal in the second mode, and wherein the fourth data line is configured to receive a fourth valid data signal in the first mode and in the second mode.

13. The display device of claim 8, wherein the third data line and the fourth data line extend in a first direction, wherein the (2-1)$^{th}$ light-emitting element and the (3-1)$^{th}$ light-emitting element are adjacent to each other in the first direction, wherein the (2-2)$^{th}$ light-emitting element and the (3-2)$^{th}$ light-emitting element are adjacent to each other in the first direction, wherein the (2-1)$^{th}$ light-emitting element and the (3-2)$^{th}$ light-emitting element are adjacent to each other in a second direction crossing the first direction, and wherein the (3-1)$^{th}$ light-emitting element and the (2-2)$^{th}$ light-emitting element are adjacent to each other in the second direction.

14. The display device of claim 8, wherein the third data line and the fourth data line extend in a first direction, wherein the (2-1)$^{th}$ light-emitting element and the (3-1)$^{th}$ light-emitting element are adjacent to each other in the first direction, wherein "k" of the (2-1)$^{th}$ light-emitting elements and "l" of the (3-2)$^{th}$ light-emitting elements are alternately and repeatedly arranged in a second direction crossing the first direction, "k" and "l" being a respective integer of 2 or more, and wherein "k" of the (3-1)$^{th}$ light-emitting elements and "l" of the (2-2)$^{th}$ light-emitting elements are alternately and repeatedly arranged in the second direction.

15. The display device of claim 1, further comprising a light-shielding pattern above the (1-1)$^{th}$ light-emitting element and the (1-2)$^{th}$ light-emitting element, and defining:

a first opening corresponding to the (1-1)$^{th}$ light-emitting element; and a second opening having a size that is smaller than a size of the first opening, and corresponding to the (1-2)$^{th}$ light-emitting element.

16. A display device comprising:

a first data line extending in a first direction;

a second data line extending in the first direction;

a plurality of wide pixels; and a plurality of narrow pixels, wherein a first group and a second group comprises a first wide pixel, a second wide pixel, a first narrow pixel, and a second narrow pixel, wherein the first wide pixel and the second wide pixel of the first group are connected to the first data line and are in a same first row extending in a second direction crossing the first direction, wherein the first narrow pixel and the second narrow pixel of the first group are connected to the second data line and are in a same second row extending in the second direction, wherein the first wide pixel and the first narrow pixel of the second group are connected to a first one of the first data line or the second data line, and wherein the second wide pixel and the second narrow pixel of the second group are connected to a second one of the first data line or the second data line.

17. The display device of claim 16, wherein the first group and the second group are alternately arranged in the first direction.

18. The display device of claim 16, wherein the first wide pixel of the first group and the first wide pixel of the second group comprises:

a (1-1)$^{th}$ pixel circuit connected to the first data line; and a (1-1)$^{th}$ light-emitting element connected to the (1-1)$^{th}$ pixel circuit, and wherein the second narrow pixel of the first group and the second narrow pixel of the second group comprises:

a (2-2)$^{th}$ pixel circuit connected to the second data line; and a (1-4)$^{th}$ light-emitting element connected to the (2-2)$^{th}$ pixel circuit.

19. An electronic device comprising:

a display device for provide an image, and comprising:

a first data line;

a second data line;

a (1-1)$^{th}$ pixel circuit connected to the first data line;

a (2-1)$^{th}$ pixel circuit connected to the second data line;

a (1-1)$^{th}$ light-emitting element connected to the (1-1)$^{th}$ pixel circuit, having a first state in a first mode, and having a second state in a second mode;

a (1-2)$^{th}$ light-emitting element connected to the (2-1)$^{th}$ pixel circuit, and having the first state in the first mode and in the second mode;

a first bridge line crossing the first data line, and connecting the (2-1)$^{th}$ pixel circuit and the (1-2)$^{th}$ light-emitting element;

a (1-2)$^{th}$ pixel circuit connected to the first data line;

a (2-2)$^{th}$ pixel circuit connected to the second data line;

a (1-3)$^{th}$ light-emitting element connected to the (1-2)$^{th}$ pixel circuit, having the first state in the first mode, and having the second state in the second mode;

a (1-4)$^{th}$ light-emitting element connected to the (2-2)$^{th}$ pixel circuit, and having the first state in the first mode and in the second mode; and a second bridge line crossing the first data line, and connecting the (1-2)$^{th}$ pixel circuit and the (1-3)$^{th}$ light-emitting element, wherein the (1-1)$^{th}$ light-emitting element and the (1-3)$^{th}$ light-emitting element are in a same first row and are electrically connected to the first data line, and wherein the (1-2)$^{th}$ light-emitting element and the (1-4)$^{th}$ light-emitting element are in a same second row and are electrically connected to the second data line.

* * * * *